(12) United States Patent
Hein et al.

(10) Patent No.: US 12,551,176 B2
(45) Date of Patent: Feb. 17, 2026

(54) SYSTEM AND METHOD FOR DETERMINING A ROTATIONAL OFFSET OF AN ANTI-SCATTER GRID FOR A COMPUTED TOMOGRAPHY SYSTEM

(71) Applicant: CANON MEDICAL SYSTEMS CORPORATION, Tochigi (JP)

(72) Inventors: Ilmar Hein, Vernon Hills, IL (US); Xiaohui Zhan, Vernon Hills, IL (US); Ruoqiao Zhang, Vernon Hills, IL (US)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 275 days.

(21) Appl. No.: 18/509,791

(22) Filed: Nov. 15, 2023

(65) Prior Publication Data

US 2025/0152116 A1    May 15, 2025

(51) Int. Cl.
*G01T 7/00*         (2006.01)
*A61B 6/42*         (2024.01)

(52) U.S. Cl.
CPC .......... *A61B 6/4291* (2013.01); *A61B 6/4241* (2013.01)

(58) Field of Classification Search
CPC ... G01T 1/20183; G01T 7/005; G01T 1/2928; G01T 1/2985; A61B 6/4241; A61B 6/4291; A61B 6/5282; A61B 6/483; A61B 6/08; A61B 6/584; G21K 1/025
See application file for complete search history.

(56) References Cited

U.S. PATENT DOCUMENTS

| | | |
|---|---|---|
| 2017/0265822 A1 | 9/2017 | Du |
| 2021/0290195 A1 | 9/2021 | Xiaohui et al. |
| 2022/0313203 A1 | 10/2022 | Zhan et al. |
| 2025/0012937 A1* | 1/2025 | Zhan ................... A61B 6/5282 |

* cited by examiner

*Primary Examiner* — Don K Wong
(74) *Attorney, Agent, or Firm* — Oblon, McClelland, Maier & Neustadt, L.L.P.

(57) ABSTRACT

A method of imaging includes analyzing a first image to detect objects in the first image and corresponding features of the objects; based on a detection result of a first object having a corresponding first object feature in the first image, selecting an action corresponding to the first object and the first object feature from a database; determining an updated set of scan parameters based on the selected action; and adjusting at least one of the table, the X-ray source, the X-ray detector, and the arm based on the updated set of scan parameters.

20 Claims, 20 Drawing Sheets

Simulate ASG air count data for different values of $d_L$

Generate ASG Offset Curves from Air $d_L[ASG\_Offset]$

Generate lookup table

SYSTEM AND METHOD FOR DETERMINING A ROTATIONAL OFFSET OF AN ANTI-SCATTER GRID FOR A COMPUTED TOMOGRAPHY SYSTEM

FIELD

This disclosure relates to a radiation detection apparatus used in a photon-counting computed tomography system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Computed tomography (CT) systems and methods are widely used, particularly for medical imaging and diagnosis. CT systems generally create projection images of one or more sectional slices through a subject's body. A radiation source, such as an X-ray source, irradiates the body from one side. A collimator, generally adjacent to the X-ray source, limits the angular extent of the X-ray beam, so that radiation impinging on the body is substantially confined to a planar region (i.e., an X-ray projection plane) defining a cross-sectional slice of the body. At least one detector (and generally many more than one detector) on the opposite side of the body receives radiation transmitted through the body in the projection plane. The attenuation of the radiation that has passed through the body is measured by processing electrical signals received from the detector. In some implementations a multi slice detector configuration is used, providing a volumetric projection of the body rather than planar projections.

Typically, the X-ray source is mounted on a gantry that revolves about a long axis of the body. The detectors are likewise mounted on the gantry, opposite the X-ray source. A cross-sectional image of the body is obtained by taking projective attenuation measurements at a series of gantry rotation angles, transmitting the projection data/sinogram to a processor via the slip ring that is arranged between a gantry rotor and stator, and then processing the projection data using a CT reconstruction algorithm (e.g., inverse Radon transform, a filtered back-projection, Feldkamp-based cone-beam reconstruction, iterative reconstruction, or other method). For example, the reconstructed image can be a digital CT image that is a square matrix of elements (pixels), each of which represents a volume element (a volume pixel or voxel) of the patient's body. In some CT systems, the combination of translation of the body and the rotation of the gantry relative to the body is such that the X-ray source traverses a spiral or helical trajectory with respect to the body. The multiple views are then used to reconstruct a CT image showing the internal structure of the slice or of multiple such slices.

A CT sinogram indicates attenuation through the body as a function of position along a detector array and as a function of the projection angle between the X-ray source and the detector array for various projection measurements. In a sinogram, the spatial dimensions refer to the position along the array of X-ray detectors. The time/angle dimension refers to the projection angle of X-rays, which changes as a function of time during a CT scan. The attenuation resulting from a portion of the imaged object (e.g., a vertebra) will trace out a sine wave around the vertical axis. Those portions farther from the axis of rotation correspond to sine waves with larger amplitudes, and the phase of the sine waves corresponds to the angular positions of objects around the rotation axis. Performing the inverse Radon transform—or any other image reconstruction method—reconstructs an image from the projection data in the sinogram.

In CT systems, x-rays incident on the detector ideally travel in straight line paths from the source through the patient to the detector. However, X-ray scatter occurs through the patient, causing incident x-rays to arrive from different non-straight line paths. These scattered X-rays cause degradation of the resulting patient image. To minimize scattered x-rays from reaching the detector, anti-scatter collimators or grids (ASGs) can be placed directly in front of the detector. With the ASG in place, scattered X-rays from oblique angles can be absorbed by the ASG, while straight line path X-rays can freely reach the detector.

For a semiconductor (CdTe/CZT)-based photon counting CT (PCCT), a detector array design can include a much smaller pixel size compared to other CT detectors due to the trade-off between a charging sharing effect and a pulse pile up effect to achieve the best energy resolving performance. The pixel pitch can be between 250 µm and 500 µm in one dimension, compared to ~1 mm for the common pixel pitch. Thus, the common detector pixel area can be typically equivalent to a N×N group of sub-pixels in PCCT, where N can be between 2 to 4. To maintain high dose efficiency, the ASG design can still remain in the same pitch/spacing as other common system pixel distributions.

One important application for the PCCT is spectral imaging. To achieve good performance, accurate X-ray source position and ASG alignment can help solve the problem of measuring the viability of a detector module of the radiation detector. In practice, the ASG is not perfectly aligned and oriented with the detector, and the overall ASG may be, for example, rotated out of alignment. Current technology does not possess a means of physically measuring the misalignment of the ASG or the X-ray source position offset. Therefore, a new method of radiation detector design can be desired for monitoring/calibration purposes without the use of external measuring tools.

SUMMARY

The present disclosure relates to an imaging apparatus, including: a radiation detector including a plurality of channels; an anti-scatter grid (ASG) arranged on an incident side of the radiation detector and including a plurality of septa corresponding to the plurality of channels; and processing circuitry configured to obtain count data via an air scan using the ASG arranged on the radiation detector, determine, based on the obtained count data, ASG offset values for a first set of the plurality of septa, determine, based on the determined ASG offset values, a rotational offset distance of the ASG corresponding to a first channel, and adjust an arrangement of the ASG based on the determined rotational offset distance.

The disclosure additionally relates to a method of adjusting an anti-scatter grid (ASG) in an imaging apparatus, including obtaining count data via an air scan using an anti-scatter grid (ASG) arranged on an incident side of a radiation detector including a plurality of channels and a plurality of septa corresponding to the plurality of channels, the ASG arranged on the radiation detector; determining, based on the obtained count data, ASG offset values for a first set of the plurality of septa; determining, based on the determined ASG offset values, a rotational offset distance of the ASG corresponding to a first channel; and adjusting an arrangement of the ASG based on the determined rotational offset distance.

The disclosure additionally relates to a non-transitory computer-readable storage medium including executable instructions, which when executed by circuitry, cause the circuitry to perform a method of adjusting an ASG in an imaging apparatus, including obtaining count data via an air scan using an anti-scatter grid (ASG) arranged on an incident side of a radiation detector including a plurality of channels and a plurality of septa corresponding to the plurality of channels, the ASG arranged on the radiation detector; determining, based on the obtained count data, ASG offset values for a first set of the plurality of septa; determining, based on the determined ASG offset values, a rotational offset distance of the ASG corresponding to a first channel; and adjusting an arrangement of the ASG based on the determined rotational offset distance.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION

Figure 1:
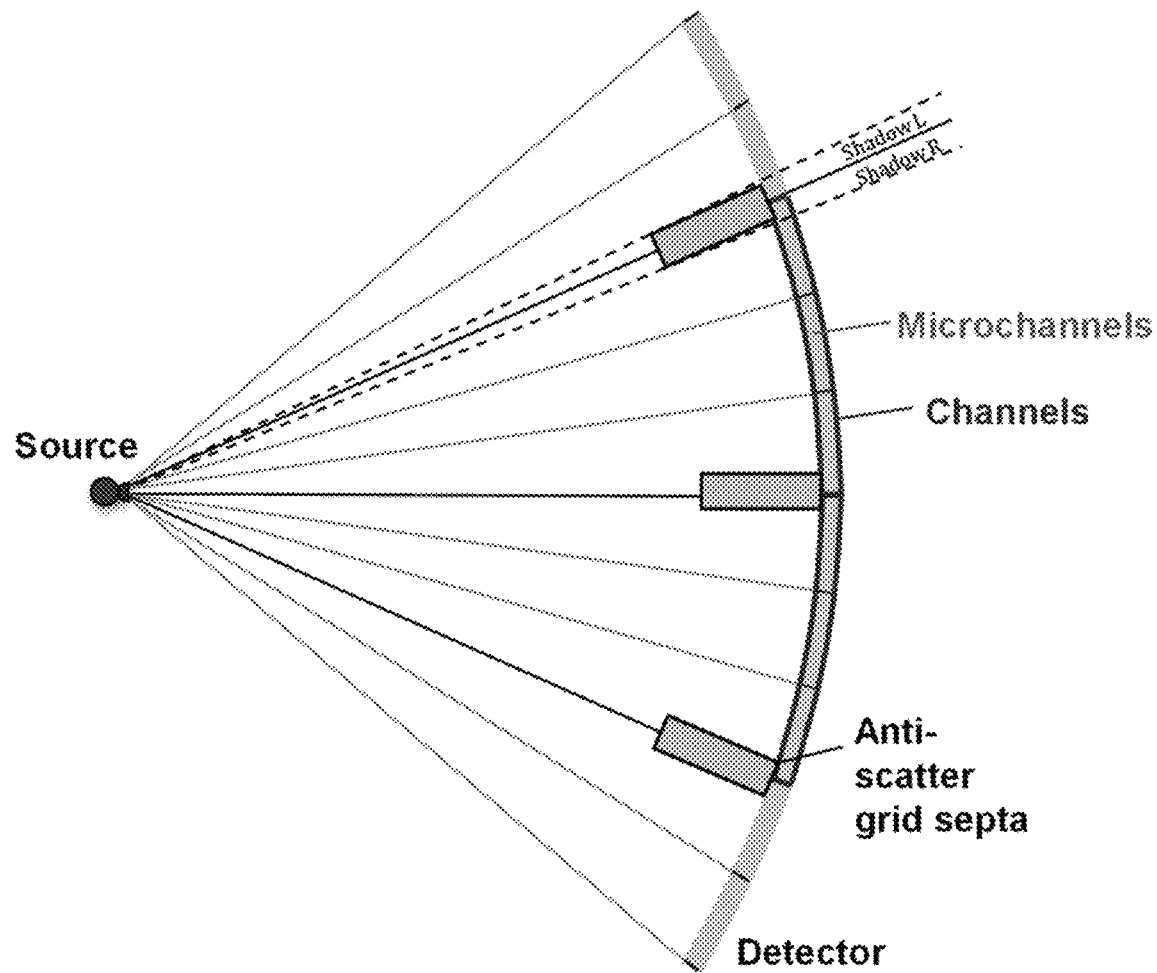
FIG. 1 is a schematic illustrating an exemplary embodiment of a radiation detector, wherein an X-ray source is opposed by a curved detector surface, the detector surface including a plurality of macro channels, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Aspects of this embodiment are directed to a radiation detector design for identifying ASG offset and X-ray source misalignment. The radiation detector design includes a radiation detector apparatus opposite an X-ray emitter comprised of a two-dimensional array of 38 detector modules in one embodiment. Simulated offsets were generated and compared to the mean offset calculated by the method of the radiation detector design corresponding with a tilt angle in accordance with one embodiment.

FIG. 1 is a schematic illustrating an exemplary embodiment of a radiation detector, wherein an X-ray source is opposed by a curved detector surface, the detector surface including a plurality of macro channels, according to an embodiment of the present disclosure. In an embodiment, each channel can include, for example, three microchannels. A septum of the anti-scatter grid (ASG) is disposed on the right edge and the left edge of each of the plurality of macro channels. Each of the microchannels has an equal pixel width according to one example.

The X-ray source can emit photons. The microchannels can be configured to absorb the emitted photons and convert the photons into an electric signal. The photons can travel along a straight line such that the septa of the ASG can cast a shadow (e.g., a left shadow and a right shadow) on the adjacent microchannels, wherein the shadows cast by the septa can reduce the photon absorption by the detector. Additionally, a rotational misalignment of the ASG can occur as well.

Figure 2:
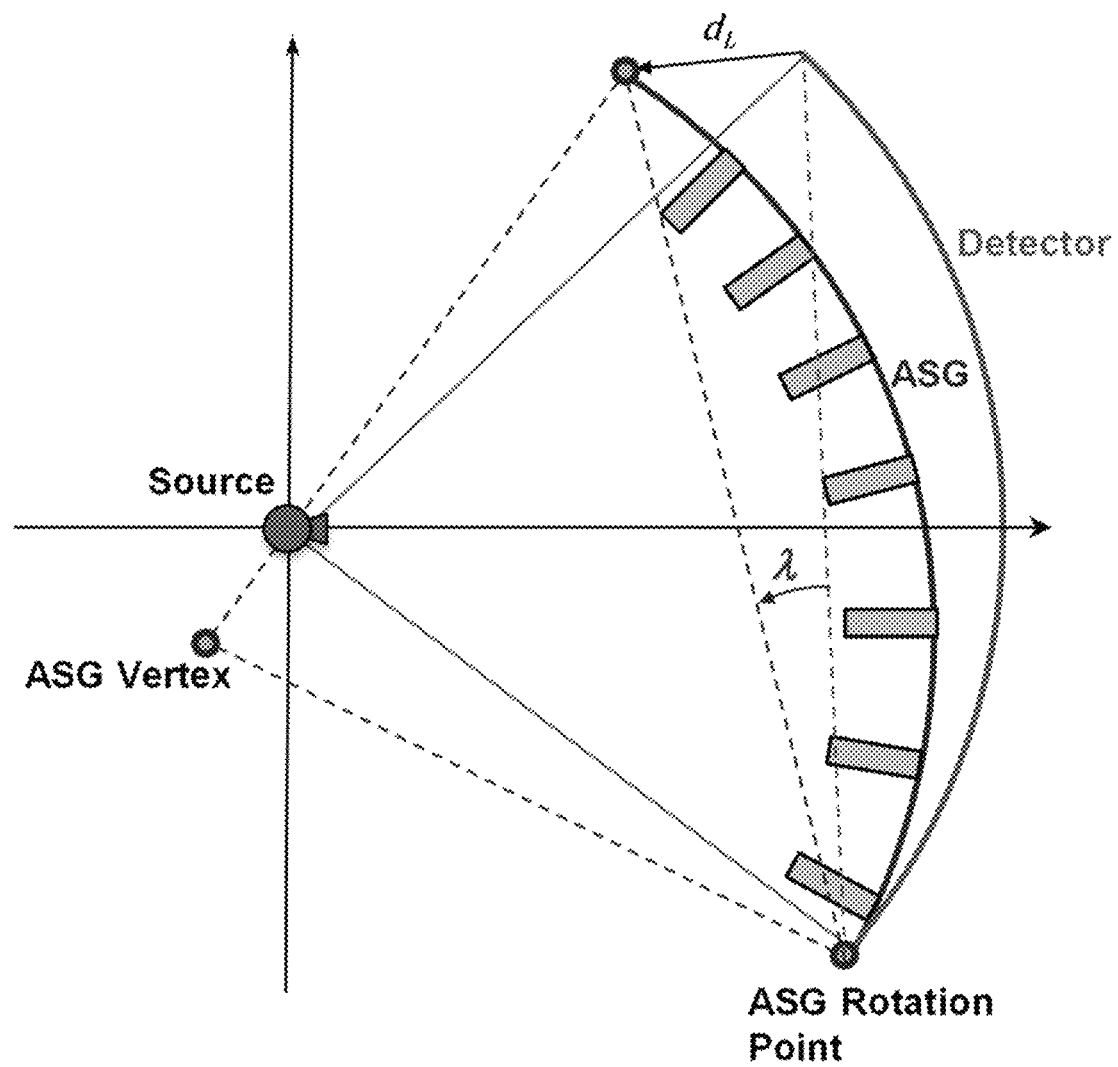
FIG. 2 is a schematic illustrating the rotational misalignment of the ASG relative to the X-ray source and the detector modules, according to an embodiment of the present disclosure.

To this end, described herein is a method and apparatus that can address the issue of overall rotational misalignment of the ASG with the detector. FIG. 2 is a schematic illustrating the rotational misalignment of the ASG relative to the X-ray source and the detector modules, according to an embodiment of the present disclosure. In an embodiment, the ASG misalignment includes a rotation by angle λ with respect to the detector, with the point of rotation at one edge of the detector. This can cause the other edge of the ASG to be offset by a distance $d_L$. There can be a challenge in physically measuring λ or $d_L$; thus, the method described herein aims to estimate the rotation angle and/or the offset distance from available scan data.

In one embodiment the radiation detector apparatus includes 38 DMB each having detector pixels facing towards the X-ray source. In an aspect, each of the DMB can be further subdivided into four CZT submodules. Each of the CZT submodules can include, for example, a 36×24 array of micropixels in accordance with one embodiment.

In one embodiment, the micropixels in the row direction of each of the DMB are denoted as micro rows, the micropixels in the column direction of each of the DMB are denoted as micro channels. In one exemplary embodiment, the ASG are disposed bisecting every third microchannel. In this arrangement, the ASG septa cast no shadow on the central micropixel and filter out scattered X-ray photons emitted by the X-ray source, thus improving image quality and avoiding issues that would degrade the image, such as ring artifacts.

In another embodiment, each of the DMB comprises an array of 12 CZT submodules arranged in a 2×6 grid pattern, wherein the ASG are disposed on every third micropixel of each of the CZT. In this embodiment, each septum of the ASG comprises a lead strip separated by a low attenuating interspace material such as carbon fiber or aluminum running along in between every third micropixel.

Figure 3:
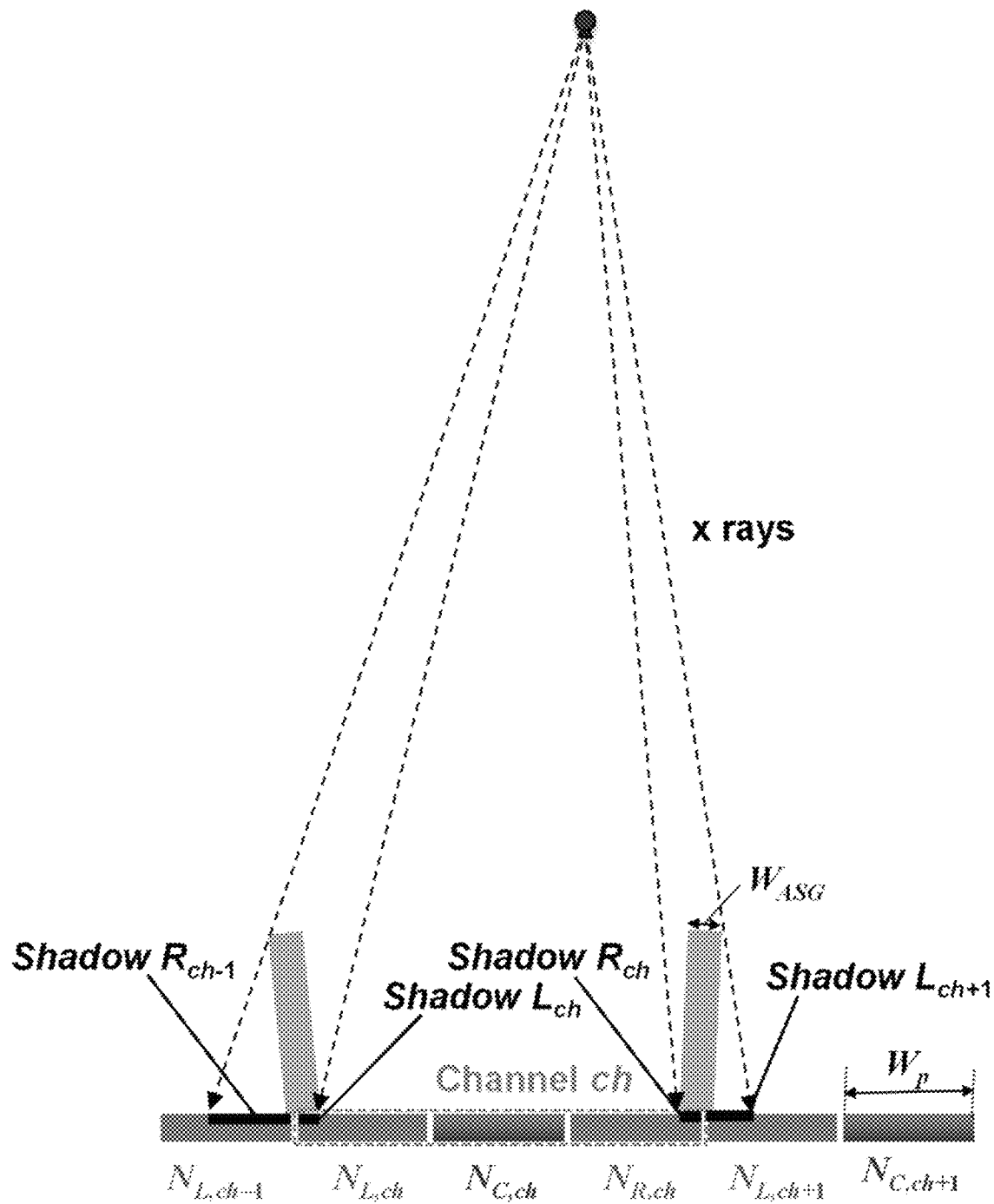
FIG. 3 illustrates an example misalignment of the ASG, wherein the ASG casts a shadow across some of the micropixels of a channel of three micropixels, according to an embodiment of the present disclosure.

FIG. 3 illustrates an example misalignment of the ASG, wherein the ASG casts a shadow across some of the micropixels of a channel of three micropixels, according to an embodiment of the present disclosure. In an embodiment, assuming that both the ASG and the micropixels are accurately positioned and aligned, the ASG's shadow can be consistent for all ASG septa positions and corresponding micropixels. During an air scan, the measured count for a specific micropixel can be directly proportional to the non-shadowed region of that micropixel. As shown in FIG. 3, the central microchannel of the channel lacks both septa and shadow, resulting in a full count.

However, if there is some misalignment between the ASG and the micropixels, as shown in FIG. 3, the counts and shadow lengths for the left and right micropixels of a channel can deviate from the ideal scenario. Equations 1-4 below can used to calculate the left and right shadow lengths and corresponding left and right ASG offsets based on the count at each micropixel, the ASG septa width, and the micropixel width:

$$\text{Shadow } R_{ch} = W_p\left(1 - \frac{N_{R,ch}}{N_{C,ch}}\right) \quad \text{(Eq. 1)}$$

$$\text{Shadow } L_{ch} = W_p\left(1 - \frac{N_{L,ch}}{N_{C,ch}}\right) \quad \text{(Eq. 2)}$$

$$\text{ASG Offset } R = \text{Shadow } Rch - (W_{ASG}/2) \quad \text{(Eq. 3)}$$

$$\text{ASG Offset } L = \text{Shadow } Lch - (W_{ASG}/2) \quad \text{(Eq. 4)}$$

wherein $W_p$ is the micropixel width, $N_{R,ch}$ is an air count for a channel corresponding to a right microchannel, $N_{L,ch}$ is an air count for a channel corresponding to a left microchannel, $N_{C,ch}$ is an air count for a channel corresponding to a center microchannel, ch is a channel identifier, and $W_{ASG}$ is the ASG septa width.

In an embodiment, using Equations 1 and 2, a shadow amount for the right and left microchannels of a given channel (Shadow $R_{ch}$ and Shadow $L_{ch}$) can be determined or calculated based on the air counts measured for the microchannel and $W_p$. Next, using Equations 3 and 4, the left and right ASG offsets can be calculated based on the determined left and right shadow amounts and the width of the corresponding ASG septa $W_{ASG}$.

Figure 4A:
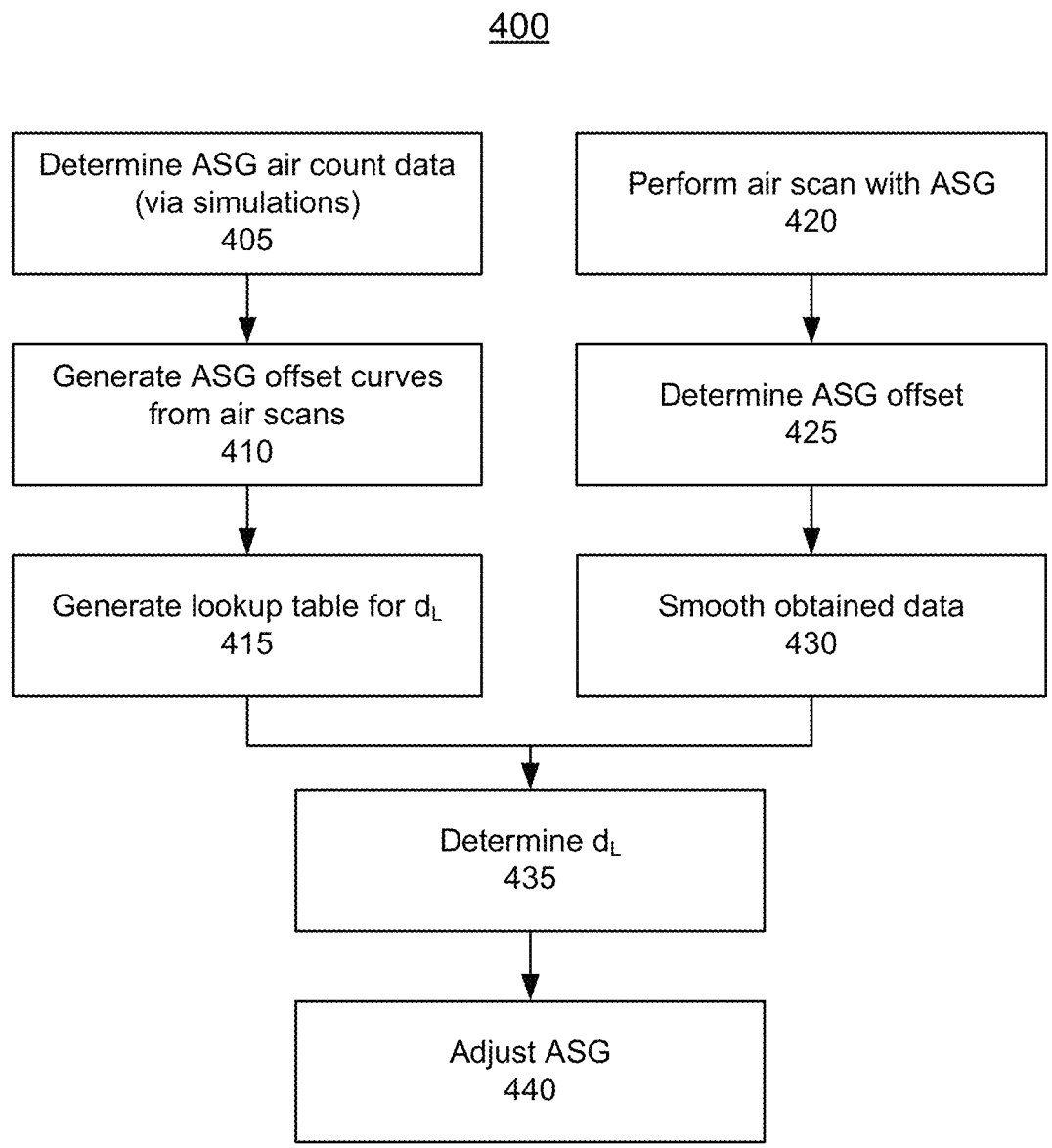
FIG. 4A shows a non-limiting example of a flow chart for a method of determining and correcting a rotational offset of the ASG, according to an embodiment of the present disclosure

FIG. 4A shows a non-limiting example of a flow chart for a method 400 of determining and correcting a rotational offset of the ASG, according to an embodiment of the present disclosure.

In an embodiment, at step 405, ASG air count data for different values of $d_L$ can be determined via simulation.

In an embodiment, at step 410, ASG offset curves from the air scan can be generated.

In an embodiment, at step 415, a lookup table can be generated for the different values of $d_L$ based on the ASG offset curves.

In an embodiment, at step 420, an air scan with the ASG can be performed.

In an embodiment, at step 425, the ASG offset can be determined.

In an embodiment, at step 430, the obtained data can be smoothed.

In an embodiment, at step 435, the rotational offset distance $d_L$ can be determined via the lookup table.

In an embodiment, at step 440, the ASG can be adjusted based on the corresponding lookup table data.

In an embodiment, in brief, the method 400 can include two initial separate processes that can be performed separate from one another. The first process starting at step 405 can include pre-calculating or pre-determining, via simulations, a lookup table with the ASG offset as an input, and the offset distance $d_L$ as an output. The second process starting at step 420 can include performing actual scans, such as an air scan with the ASG to determine the ASG offset. Then, at step 435, the $d_L$ value can be determined and the ASG can be adjusted accordingly.

Figure 4B:
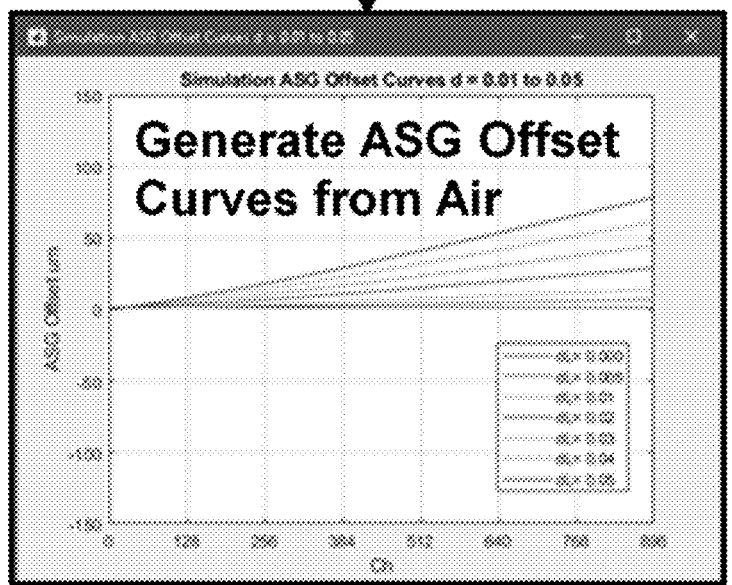
FIG. 4B shows a non-limiting example of a schematic describing the first process, according to an embodiment of the present disclosure.
Figure 4B:
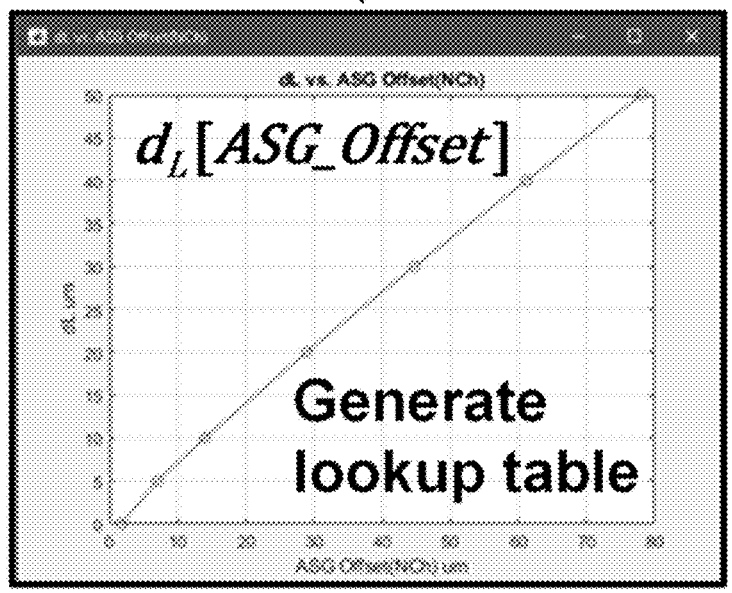

With reference to steps 405 to 415 of FIG. 4A, FIG. 4B shows a non-limiting example of a schematic describing the first process, according to an embodiment of the present disclosure. In an embodiment, the first process can be the simulation-based process. The upper box corresponds to step 405 and describes how the ASG air count data for different values of $d_L$ can be simulated. The middle box corresponds to step 410 and shows examples of simulated ASG offset curves ranging from $d_L$=0 to 0.05. As shown, as $d_L$ increases, the ASG offset also increases for a same channel across varying curves for $d_L$. This can be exhibited as a rise in the curve shown. The lower box corresponds to step 415 and shows an example of a curve describing the offset distance versus the ASG offset. As shown, as the ASG offset increases, the offset distance $d_L$ also increases. From this data, the lookup table can be generated.

Figure 5:
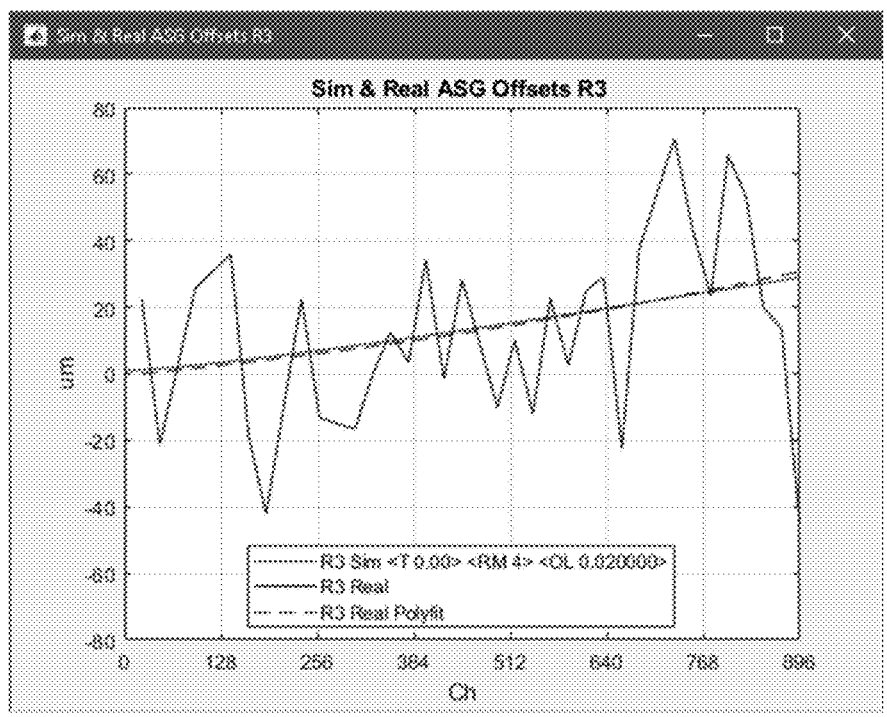
FIG. 5 shows a set of graphs describing the ASG offset and the offset distance as a function of the ASG offset, according to an embodiment of the present disclosure.
Figure 5:
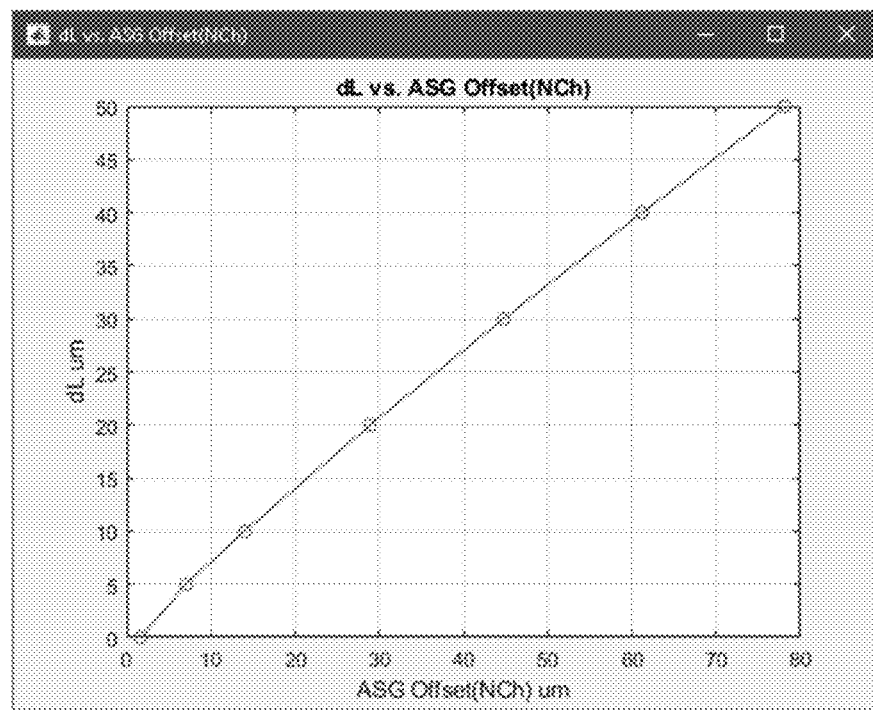

Notably, during the air scan, the ASG offset curve shape and fit can exhibit a pattern and shape. To this end, FIG. 5 shows a set of graphs describing the ASG offset and the offset distance as a function of the ASG offset, according to an embodiment of the present disclosure. In an embodiment, the upper graph describes the ASG offset for a simulated air scan and a real air scan, while the lower graph describes the relationship between the offset distance and the ASG offset. As shown in the upper graph, the non-smooth, solid curve shows the real ASG offset measurement from an air scan, which can exhibit noise due to the individual ASG/CZT offsets.

In addition to the individual offsets, there can be an overall rise to the curve due to the ASG rotational offset. Therefore, the dashed curve is a second order polynomial fit to the ASG/CZT offset plot, which can be used to smooth out the noisy curve. A last channel point (x-axis) on the polynomial fit can be used as the input to the lookup table. In an embodiment, a different channel can be used as the input, such as a channel where the offset is greatest. For example, the first channel point on the polynomial fit can be used. The solid curve that is substantially smooth (compared to the real ASG offset curve pre-smoothing) and proximal to the dashed curve can be the simulated ASG offset curve. For example, the simulated ASG offset curve can describe an offset distance of $d_L$=30 μm.

In an embodiment, the lower graph describes the offset distance versus the ASG offset, which can use the last channel point on the polynomial fit of the ASG offset curve (smoothed or un-smoothed) to determine the offset distance $d_L$. As shown, the last channel ASG offset value of the smoothed ASG offset curve can be 30.62 μm, which can correspond to a $d_L$ of 21 μm based on the curve of the lower graph. While described as graphs, it may be appreciated that the above can be used to generate the lookup table and the corresponding entries in the lookup table can be obtained in order to generate the offset distance.

With reference to step 440, the subsequent adjustment or correction of the ASG based on the determined value of $d_L$ can be performed by, for example, a technician or operator. Additionally or alternatively, the adjustment or correction can be performed automatically by, for example, a connected computer or similar processing circuitry.

Notably, as described thusfar, a point of rotation of the ASG can be assumed to be located at the first or last channel (at one edge of the detector), and the opposite channel (at the other edge of the detector) is then offset by the distance $d_L$. That is, the point of rotation of the ASG can be assumed to have zero offset.

In an embodiment, the point of rotation of the ASG need not be located at the first or last channel. Additionally or alternatively, in an embodiment, there can also be a baseline offset or general translation offset of the entire ASG from the detector. That is, the ASG need not be disposed accurately and proximal to the detector at any portion of the ASG.

Figure 6:
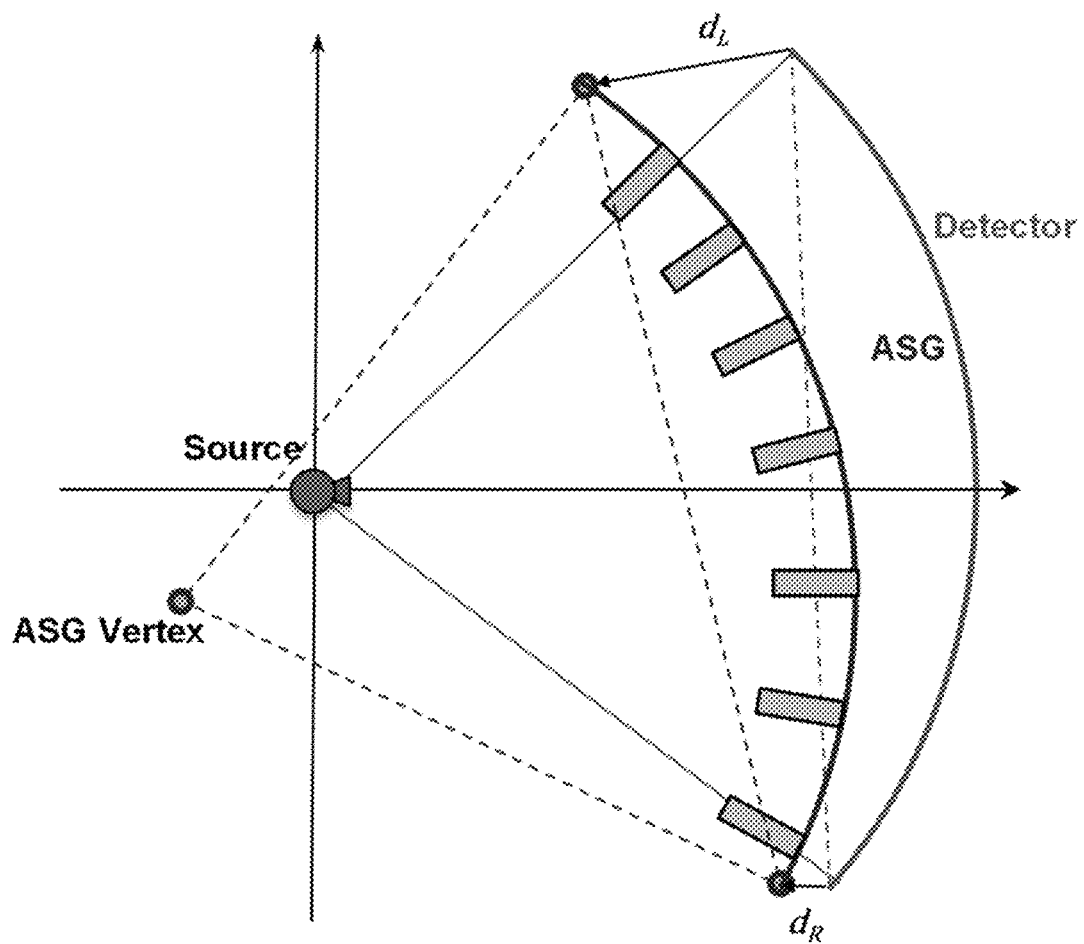
FIG. 6 shows a schematic of the ASG with a rotational offset and a translation offset relative to the detector, according to an embodiment of the present disclosure.

To this end, FIG. 6 shows a schematic of the ASG with a rotational offset and a translation offset relative to the detector, according to an embodiment of the present disclosure. Here, the value of the translation offset distance can be represented by $d_R$. Again, $d_L$ represents the offset distance caused by the rotation of the ASG but can also include the translation offset.

Figure 7:
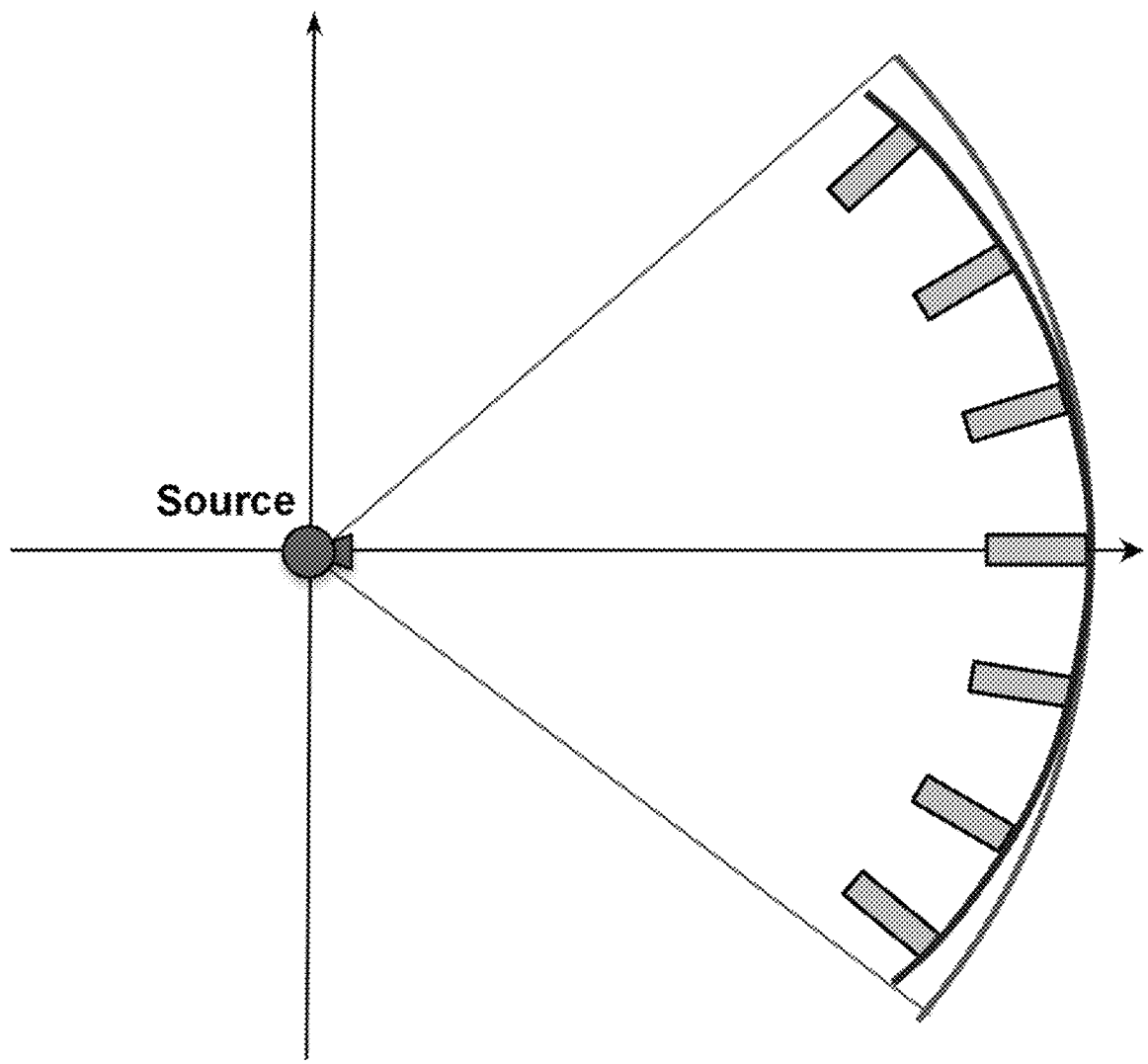
FIG. 7 shows a schematic of the ASG with a compression offset, according to an embodiment of the present disclosure.

FIG. 7 shows a schematic of the ASG with a compression offset, according to an embodiment of the present disclosure. In an embodiment, relative to the detector, the sides of the ASG exhibit a compression deformation, resulting in the compression offset from the detector. Further, a combination of the rotational offset, translation offset, and compression offset can occur. Therefore, the method described herein can determine each of the offsets using the ASG offset curve.

First, recalling the determination of $d_L$ with reference to FIG. 2, the value of $d_L$ can essentially describe the distance from the edge of the ASG to the corresponding detector location (e.g., detector channel, element, pixel, etc.). Similarly, for the event in which a compression offset occurs, the opposite edge of the ASG can be deflected away from the detector at an opposite edge of the detector. Assuming a symmetrical compression (as shown in FIG. 7), the deflection at both edges of the ASG can result in the ASG offset curve (real air scan) exhibiting an additional curve upwards terminating at a first channel. As a reminder, the ASG offset curve of FIG. 5 exhibits an upward curve starting at an offset of 0 μm for the first channel because the rotation is pinned at the first channel. For the compression offset, the ASG offset curve can start at the same ASG offset of 30.62 μm for the first channel, then decrease until reaching an ASG offset of 0 μm (since the ASG of FIG. 7 is shown as being proximal to the detector in the middle), and increase again until reaching an ASG offset of 30.62 μm. Again, since the compression offset is shown as symmetric, the ASG offset at the first channel and the last channel are the same, resulting in the shape of the ASG offset curve being a symmetric bow. Of course, these values can be used as inputs to determine via the lookup table the offset distance that can be used to adjust the ASG.

In an embodiment, this can be extended further for an event where the compressed ASG is rotated and translated, and therefore not symmetric. For such an event, the method can determine three parameters or inputs from the ASG offset curve: i) an upper channel value, ii) a lower channel value, and iii) a center channel value. The upper channel value can be the highest ASG offset value, the lower channel value can be the second highest ASG offset value, and the center channel value can be the ASG offset value for a channel disposed in between the channels corresponding to the upper channel value and the lower channel value. It may be appreciated that due to a curvature of the ASG, the lower channel value can still be higher in value than the center channel value, and that the upper channel value and the lower channel value merely describe the value relation to one another (and not including the center channel value). For example, the upper channel value can be additionally or alternatively described as a first edge channel value, the lower channel value can be a second edge channel value, and the center channel value can be a non-edge channel value.

In an embodiment, the three determined parameters can be used to determine the curvature of the ASG. As previously described, the ASG can be compressed and therefore different from the curvature of the detector. The curvature can correlate to a value of compression offset in the generated lookup table, and/or a value of compression offset in a generated curve for compression offset with respect to the ASG offset, and/or a value of compression offset in a separate generated compression offset lookup table. By determining the curvature of the ASG, the compression offset can be determined and the ASG can be adjusted and/or the compression offset can be used to improve result accuracy during image reconstruction, data processing and correction, etc.

The three determined parameters can be used to determine the lateral offset. Based on the baseline offset of the ASG offset curve, the value of the lateral offset distance $d_R$ can be determined. For example, in the upper graph of FIG. 5, the ASG offset of the first channel (towards the left on the x-axis) can be 0 for an ASG that is not offset from the first channel of the detector since the ASG shown in FIG. 2 is assumed to be disposed adjacent to the detector at one location (assumed to be the first channel). However, for an ASG that does have a lateral offset, the ASG value of the first channel (in the example of FIGS. 2 and 5) can be non-zero. Thus, the ASG offset curve would, at the first channel, start above zero, and this difference between zero and the value of the ASG offset curve at the first channel can be used to determine $d_R$. That is, the value of the ASG offset curve at the first channel (in the example of FIGS. 2 and 5) can correlate to a value of $d_R$ in the generated lookup table, and/or a value of $d_R$ in a generated curve for $d_R$ with respect to the ASG offset, and/or a value of $d_R$ in a separate generated $d_R$ lookup table.

As previously described, the three determined parameters can be used to determine the rotational offset. In particular, the method can determine the ASG offset value of the upper channel and correct for or remove the offset contributions from the lateral offset and the compression offset. Again, with reference to FIG. 5, the last channel ASG offset value of the smoothed ASG offset curve (upper graph) can be 30.62 μm, which can correspond to a $d_L$ of 21 μm based on the curve of the lower graph. Again, the values can be obtained from the graphs and/or the generated lookup table.

Figure 8:
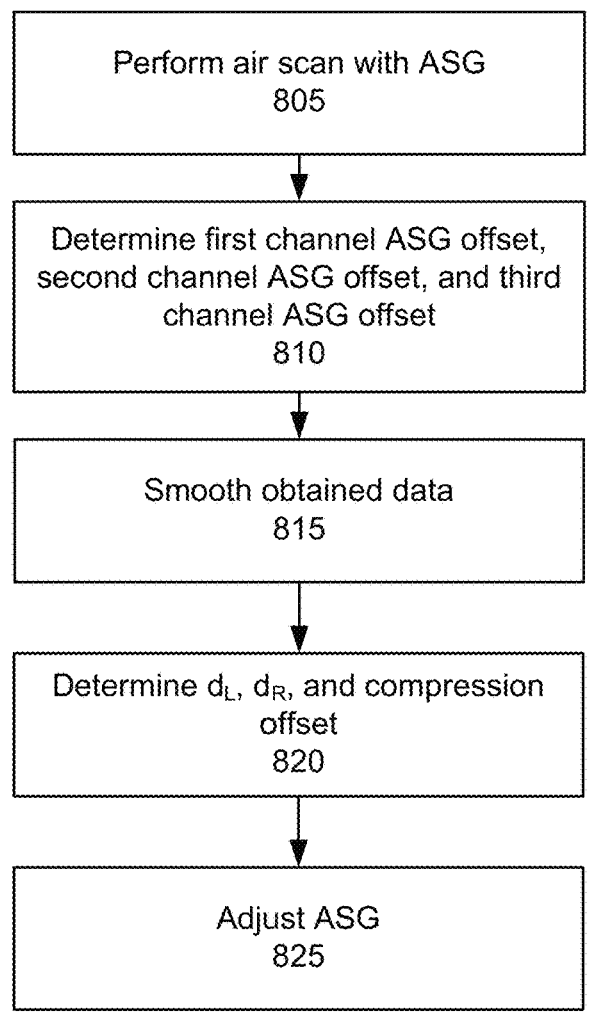
FIG. 8 shows a non-limiting example of a flow chart for a method of determining and correcting offsets of the ASG, according to an embodiment of the present disclosure.

With reference to the previously described offset determinations, FIG. 8 shows a non-limiting example of a flow chart for a method 800 of determining and correcting offsets of the ASG, according to an embodiment of the present disclosure.

In an embodiment, at step 805, an air scan with the ASG can be performed to generate an ASG offset curve.

In an embodiment, at step 810, a first channel ASG offset value (e.g., the upper channel value), a second channel ASG offset value (e.g., the lower channel value), and a third channel ASG offset value (e.g., the center channel value) can be determined from the ASG offset curve.

In an embodiment, at step 815, the obtained data of the ASG offset curve can optionally be smoothed.

In an embodiment, at step 820, the values for the rotational offset distance $d_L$, lateral offset distance $d_R$, and compression offset can be determined based on the first channel ASG offset value, second channel ASG offset value, and a third channel ASG offset values.

In an embodiment, at step 825, the ASG can be adjusted or corrected based on the determined values in step 820. For example, the compression offset can be corrected, the lateral offset distance can be corrected, and the rotational offset distance can be corrected, or any combination of any of the aforementioned. The adjustment or correction can be performed by, for example, a technician or operator. Additionally or alternatively, the adjustment or correction can be performed automatically by, for example, a connected computer or similar processing circuitry.

Figure 9:
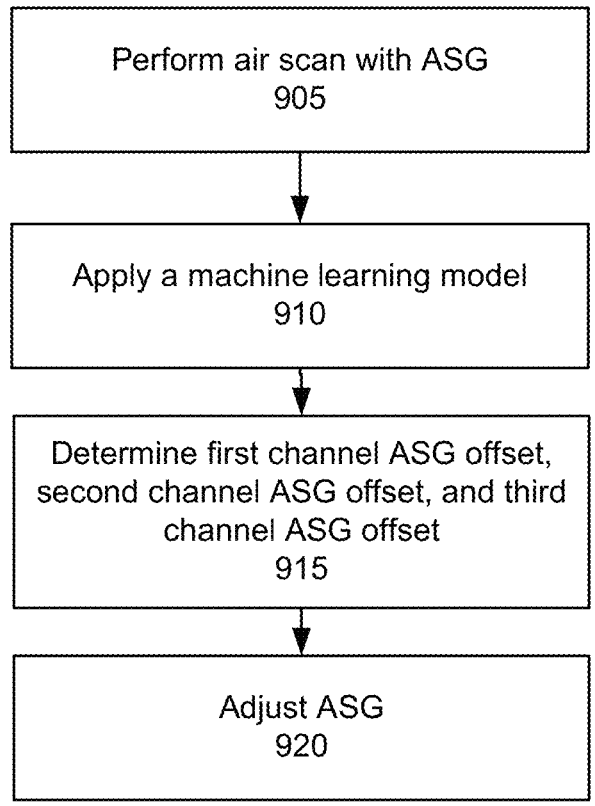
FIG. 9 shows a non-limiting example of a flow chart for a method of determining and correcting offsets of the ASG, according to an embodiment of the present disclosure.

In an embodiment, a neural network can be used to determine the aforementioned values. To this end, FIG. 9 shows a non-limiting example of a flow chart for a method 900 of determining and correcting offsets of the ASG, according to an embodiment of the present disclosure.

In an embodiment, at step 905, an air scan with the ASG can be performed to generate an ASG offset curve.

In an embodiment, at step 910, a neural network can be used to process the obtained ASG offset data.

In an embodiment, at step 915, a first channel ASG offset value (e.g., the upper channel value), a second channel ASG offset value (e.g., the lower channel value), and a third channel ASG offset value (e.g., the center channel value) can be determined from the ASG offset curve using the neural network. The neural network can use the generated lookup table(s) (or graphs) to obtain the corresponding offset distance values and compression offset based on the obtained ASG offset values.

In an embodiment, at step 920, the ASG can be adjusted or corrected based on the determined values in step 915. The adjustment or correction can be performed by, for example, a technician or operator. Additionally or alternatively, the adjustment or correction can be performed automatically by, for example, a connected computer or similar processing circuitry.

Figure 10A:
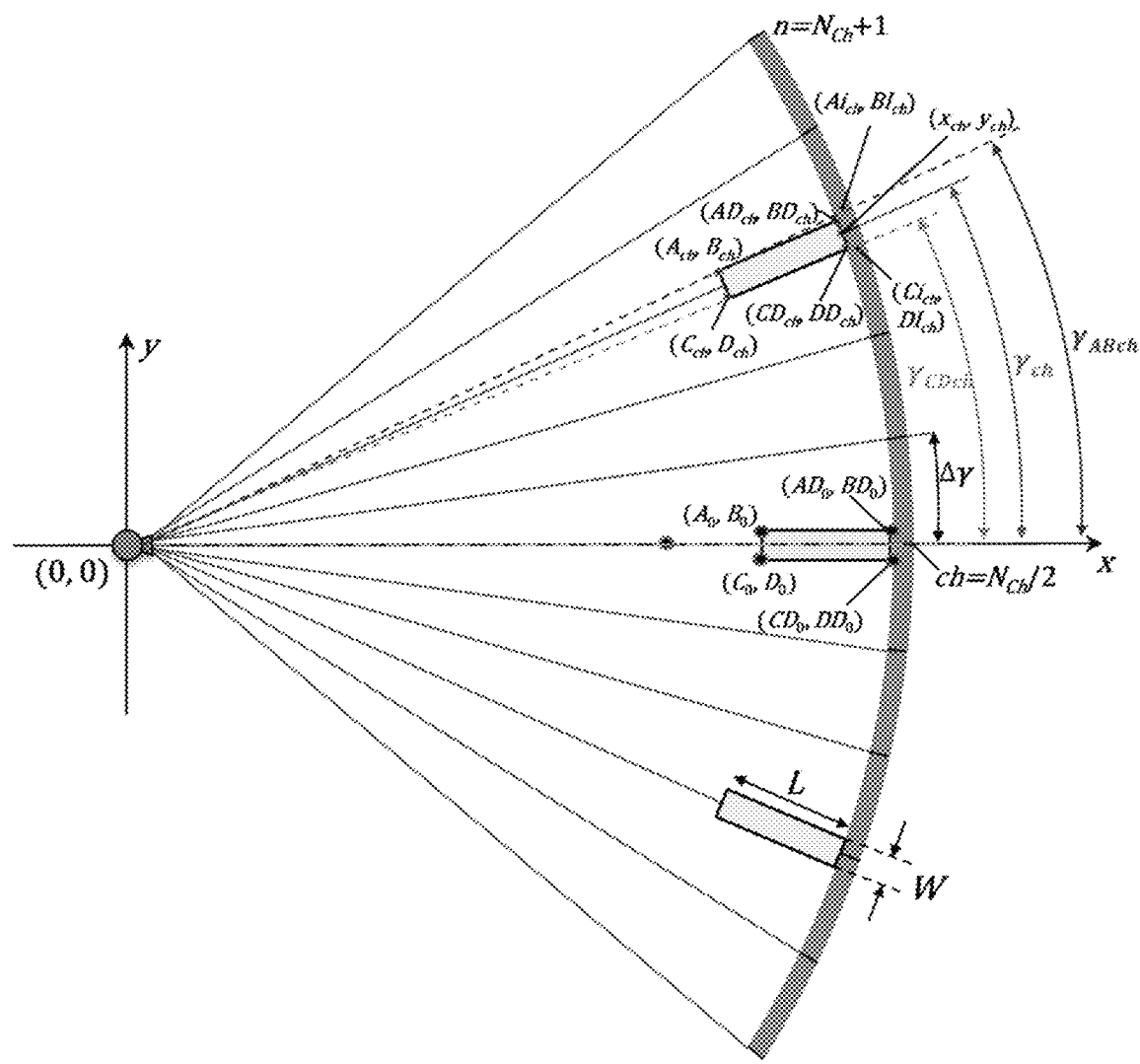
FIG. 10A illustrates an example of the geometry of a single ASG septa disposed on the radiation detector of FIG. 1, according to an embodiment of the present disclosure.

FIG. 10A illustrates an example of the geometry of a single ASG septa disposed on the radiation detector of FIG. 1, according to an embodiment of the present disclosure. Here, the coordinates of the septum at the detector center can be given by:

$$A_0 = SDD - L \quad AD_0 = SDD$$
$$B_0 = \frac{w}{2} \quad BD_0 = \frac{w}{2}$$
$$C_0 = SDD - L \quad CD_0 = SDD$$
$$D_0 = \frac{-w}{2} \quad DD_0 = \frac{-w}{2}$$

Figure 10B:
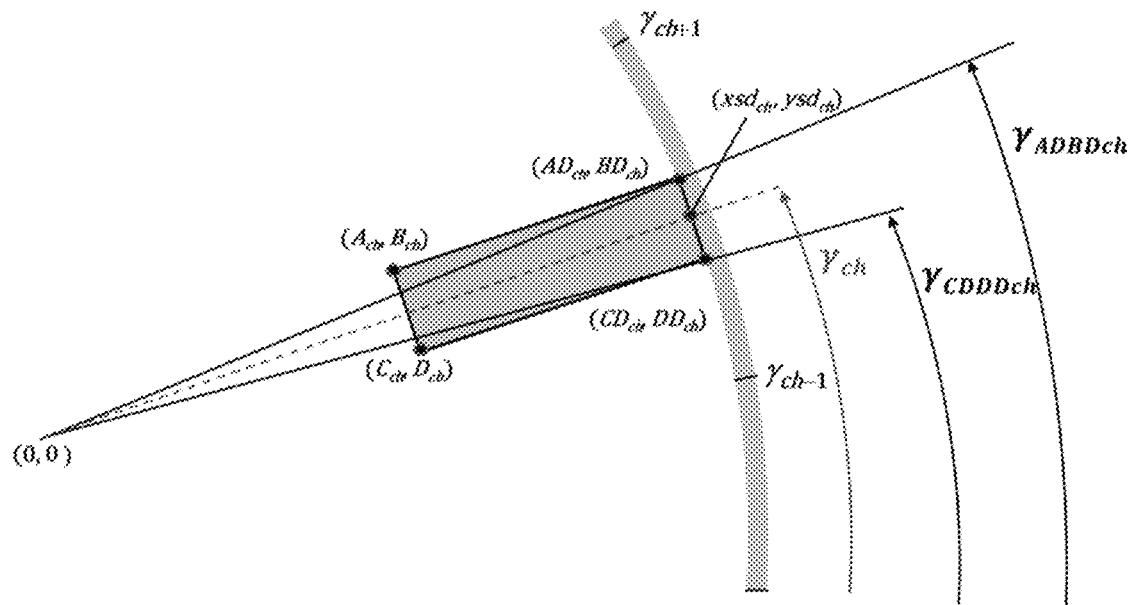
FIG. 10B illustrates an example of the geometry for the septa positions in one example, according to an embodiment of the present disclosure.

FIG. 10B illustrates an example of the geometry for the septa positions in one example, according to an embodiment of the present disclosure. Here, the ASG septa coordinates can be given by:

$$xsd_{ch} = SDD \cdot \cos(\gamma_{ch})$$
$$ysd_{ch} = SDD \cdot \sin(\gamma_{ch})$$

-continued $$A_{ch} = R_{AB} \cdot \cos(q_{AB} + \gamma_{ch})$$

$$AD_{ch} = R_{ADBD} \cdot \cos(q_{ADBD} + \gamma_{ch})$$

$$B_{ch} = R_{AB} \cdot \sin(q_{AB} + \gamma_{ch})$$

$$BD_{ch} = R_{ADBD} \cdot \sin(q_{ADBD} + \gamma_{ch})$$

$$C_{ch} = R_{CD} \cdot \cos(q_{CD} + \gamma_{ch})$$

$$CD_{ch} = R_{CDDD} \cdot \cos(q_{CDDD} + \gamma_{ch})$$

$$D_{ch} = R_{CD} \cdot \sin(q_{CD} + \gamma_{ch})$$

$$DD_{ch} = R_{CDDD} \cdot \sin(q_{CDDD} + \gamma_{ch}),$$

where $$\gamma_{ch} = \left(ch - \frac{N_{Ch}}{2}\right) \cdot \Delta\gamma \quad (0 < ch < N_{Ch} + 1)$$

$$\gamma_{ADBDch} = \gamma_{ch} + \frac{\Delta\gamma}{2}$$

$$\gamma_{CDDDch} = \gamma_{ch} - \frac{\Delta\gamma}{2}$$

$$\theta_{AB} = \tan^{-1}\left(\frac{B_0}{A_0}\right)$$

$$\theta_{ADBD} = \tan^{-1}\left(\frac{BD_0}{AD_0}\right)$$

$$\theta_{CD} = \tan^{-1}\left(\frac{D_0}{C_0}\right)$$

$$\theta_{CDDD} = \tan^{-1}\left(\frac{DD_0}{CD_0}\right)$$

$$R_{AB} = \sqrt{A_0^2 + B_0^2}$$

$$R_{ADBD} = \sqrt{AD_0^2 + BD_0^2}$$

$$R_{CD} = \sqrt{C_0^2 + D_0^2}$$

$$R_{CDDD} = \sqrt{CD_0^2 + DD_0^2}.$$

Figure 11:
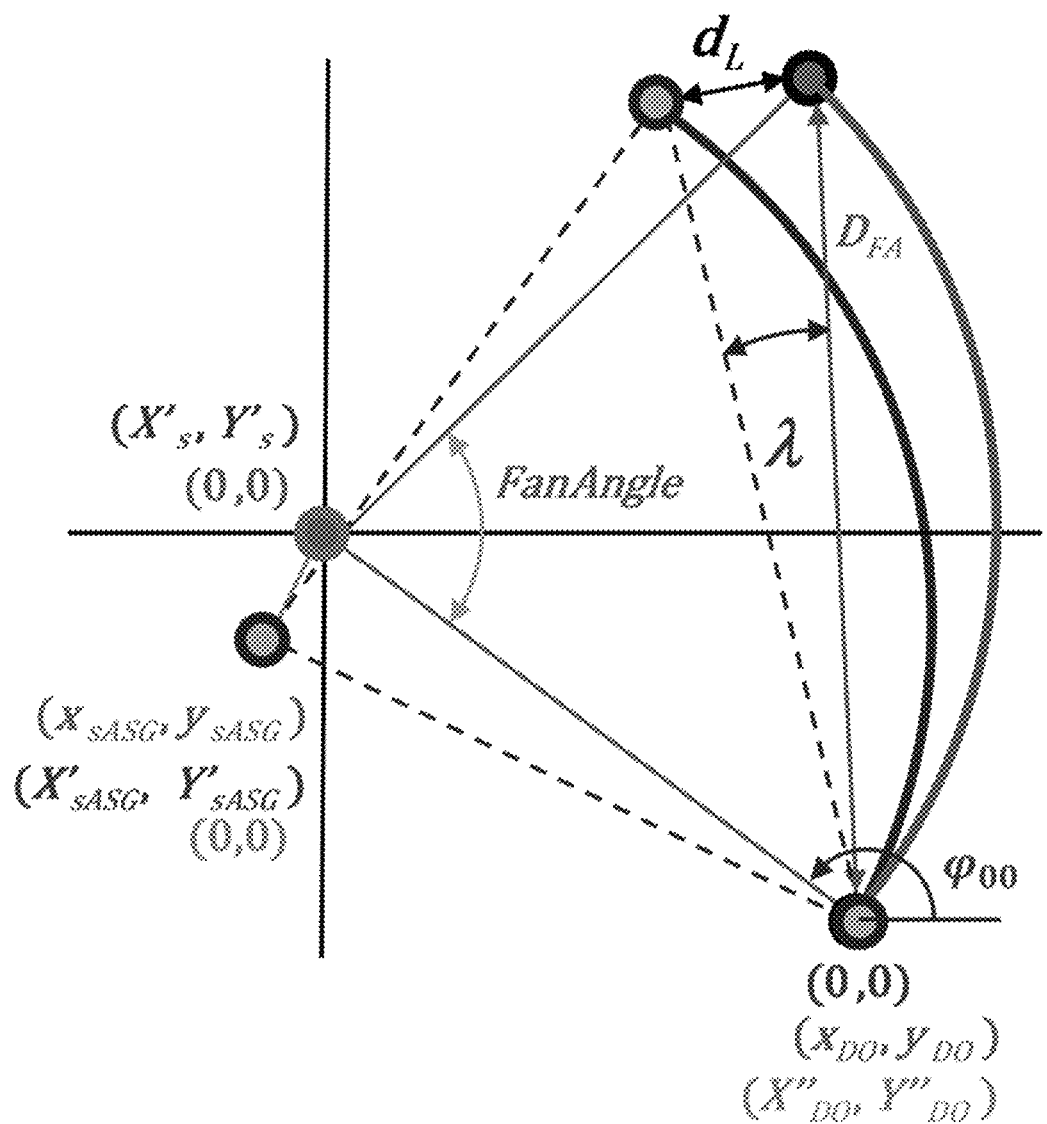
FIG. 11 illustrates an ASG rotational offset or misalignment, according to an embodiment of the present disclosure.

FIG. 11 illustrates an ASG rotational offset or misalignment, according to an embodiment of the present disclosure. In an embodiment, the ASG can be offset at one end by the rotational offset distance $d_L$ and effectively rotated by an angle 1 with a rotation point at a first detector channel. The prime coordinate system can have an origin of (0,0) at the rotation point.

A double prime coordinate system can have an origin of (0,0) at the rotated ASG source. Coordinate transformations can be used to calculate the misaligned ASG septa positions (described herein). An ideal ASG transformed to a prime coordinate system and rotated can be described by the following (i-vi):

$$\lambda = 2 \cdot \sin^{-1}\left(\frac{d_L}{D_{FA}}\right) \quad \text{(i)}$$

$$X_s' = -x_{D0} \quad Y_s' = -y_{D0} \quad \text{(ii)}$$

$$\varphi_{00} = a\tan2(Y_s', X_s') \quad \text{(iii)}$$

$$X_{sASG}' = SDD \cdot \cos(\varphi_{00} + \lambda) \quad \text{(iv)}$$

$$Y_{sASG}' = SDD \cdot \sin(\varphi_{00} + \lambda) \quad \text{(v)}$$

$$D_{FA} = 2 \cdot SDD \cdot \sin\left(\frac{\text{FanAngle}}{2}\right) \quad \text{(vi)}$$

Figure 12:
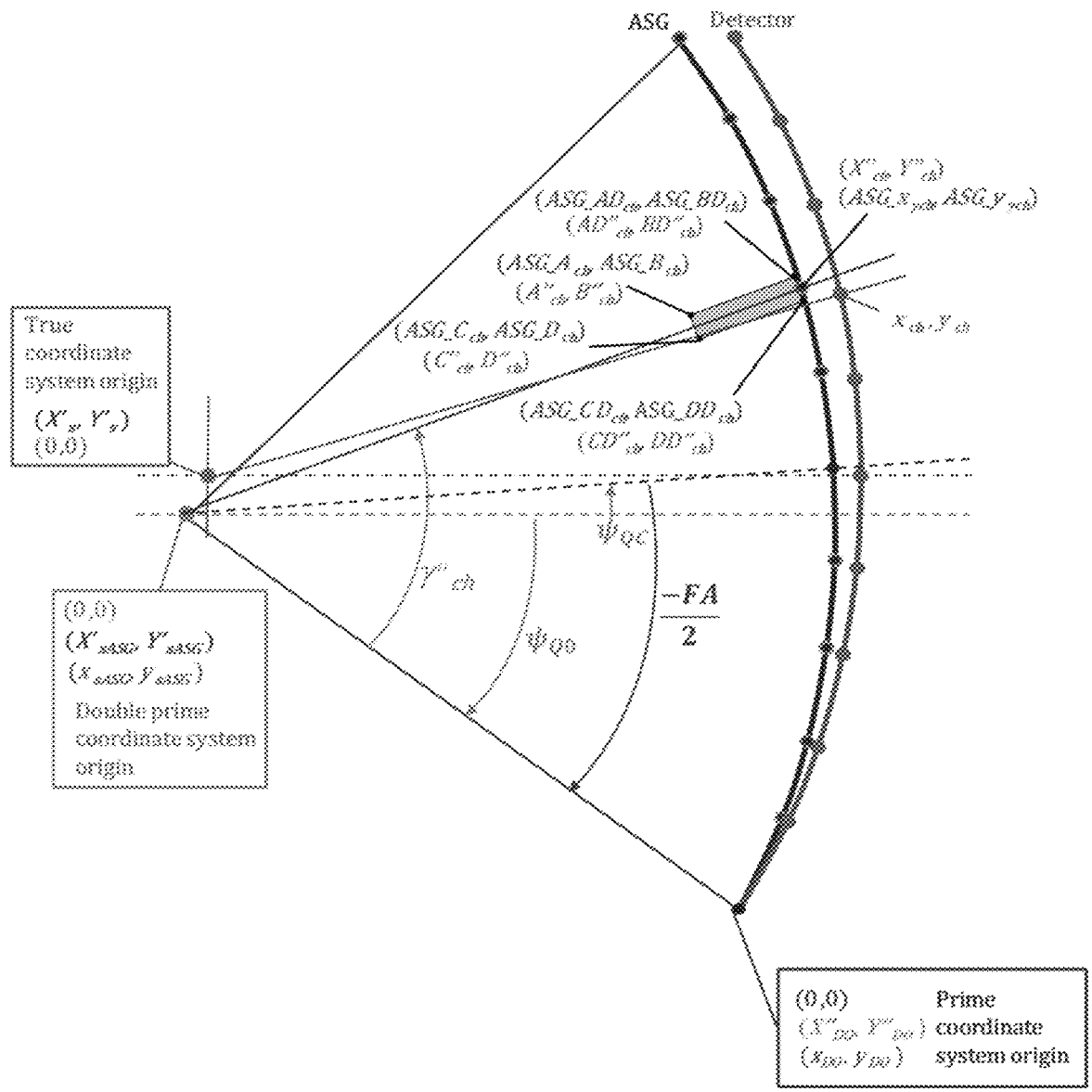
FIG. 12 illustrates a calculation for the misaligned ASG and septa, according to an embodiment of the present disclosure.

FIG. 12 illustrates a calculation for the misaligned ASG and septa, according to an embodiment of the present disclosure. In an embodiment, the rotated prime ASG transformation to the double prime coordinate system and the septa positions can be calculated via:

$$X_{ych}'' = SDD \cdot \cos(\gamma_{ch}'') \quad Y_{ych}'' = SDD \cdot \sin(\gamma_{ch}'')$$

$$A_{ch}'' = R_{AB} \cdot \cos(\theta_{AB} + \gamma_{ch}'') \quad B_{ch}'' = R_{AB} \cdot \sin(\theta_{AB} + \gamma_{ch}'')$$

$$C_{ch}'' = R_{CD} \cdot \cos(\theta_{CD} + \gamma_{ch}'') \quad D_{ch}'' = R_{CD} \cdot \sin(\theta_{CD} + \gamma_{ch}'')$$

$$AD_{ch}'' = R_{ADBD} \cdot \cos(\theta_{ADBD} + \gamma_{ch}'') \quad BD_{ch}'' = R_{ADBD} \cdot \sin(\theta_{ADBD} + \gamma_{ch}'')$$

$$CD_{ch}'' = R_{CDDD} \cdot \cos(\theta_{CDDD} + \gamma_{ch}'') \quad DD_{ch}'' = R_{CDDD} \cdot \sin(\theta_{CDDD} + \gamma_{ch}'')$$

$$X_{D0}'' = -X_{sA}'$$

$$Y_{D0}'' = -Y_{sA}'$$

$$\varphi_{Q0} = a\tan2(Y_{D0}'', X_{D0}'')$$

$$\varphi_{QC} = \frac{FA}{2} - \varphi_{Q0}$$

$$\gamma_{ch}' = \gamma_{ch} + \psi_{QC}.$$

In an embodiment, the rotated double prime septa positions transformation back to the prime coordinate system can be calculated via:

$$X_{ch}' = X_{ych}'' + X_s' \quad Y_{ch}' = Y_{gch}'' + Y_s'$$

$$A_{ch}' = A_{ch}'' + X_s' \quad AD_{ch}' = AD_{ch}'' + X_s'$$

$$B_{ch}' = B_{ch}'' + Y_s' \quad BD_{ch}' = BD_{ch}'' + Y_s'$$

$$C_{ch}' = C_{ch}'' + X_s' \quad CD_{ch}' = CD_{ch}'' + X_s'$$

$$D_{ch}' = D_{ch}'' + Y_s' \quad DD_{ch}' = DD_{ch}'' + Y_s'$$

In an embodiment, the rotated double prime septa positions transformation back to the true coordinate system can be calculated via:

$$\text{ASG}\_x_{ych} = X_{ch}' + dx \quad \text{ASG}\_y_{ch} = Y_{ch}' + dy$$

$$\text{ASG}\_A_{ych} = A_{ch}' + dx \quad \text{ASG}\_AD_{ch} = AD_{ch}' + dx$$

$$\text{ASG}\_B_{ych} = B_{ch}' + dy \quad \text{ASG}\_BD_{ch} = BD_{ch}' + dy$$

$$\text{ASG}\_C_{ych} = C_{ch}' + dx \quad \text{ASG}\_CD_{ch} = CD_{ch}' + dx$$

$$\text{ASG}\_D_{ch} = D_{ch}' + dy \quad \text{ASG}\_DD_{ch} = DD_{ch}' + dy$$

$$x_{sASG} = X_s' + dx \quad y_{sASG} = Y_s' + dy$$

$$dx = x_{D0} - X_{ch=0}' \quad dy = y_{D0} - Y_{ch=0}'$$

Figure 13:
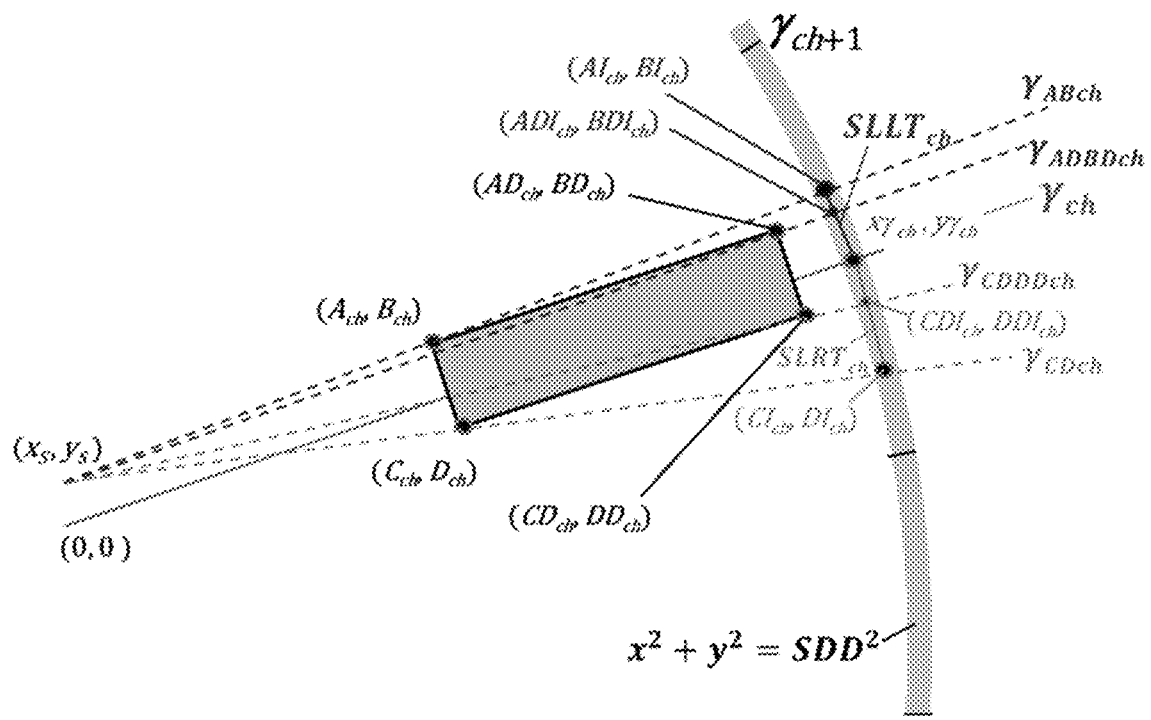
FIG. 13 illustrates the geometry for performing ASG offset calculations, according to an embodiment of the present disclosure.

FIG. 13 illustrates the geometry for performing ASG offset calculations, according to an embodiment of the present disclosure. In an embodiment, the left and right offsets can be given by:

$$\text{ASG\_Offset\_Leftch} = SLLT_{ch} - \frac{w}{2}$$

$$\text{ASG\_Offset\_Rightch} = SLRT_{ch} - \frac{w}{2}$$

wherein if $\gamma_{ABch} > \gamma_{ADBDch}$, $$SLLT_{ch} = \sqrt{(AI_{ch} - x_{ch})^2 + (BI_{ch} - y_{ch})^2}$$

otherwise, $$SLLT_{ch} = \sqrt{(ADI_{ch} - x_{ch})^2 + (BDI_{ch} - y_{ch})^2},$$

and if $\gamma_{CDch} < \gamma_{CDDDch}$, $$SLRT_{ch} = \sqrt{(CI_{ch} - x_{ch})^2 + (DI_{ch} - y_{ch})^2},$$

otherwise, $$SLRT_{ch} = \sqrt{(CDI_{ch} - x_{ch})^2 + (DDI_{ch} - y_{ch})^2}.$$

Further, the four septa ray-to-detector intersection points and angles can be given by:

$$X, Y = A, B;$$

$$C, D;$$

$$AD, BD;$$

$$CD, DD$$

Septa corner points $$M = AB;$$

$$CD;$$

$$ADBD;$$

$$CDDD$$

$$XI, YI = AI, BI;$$

$$CI, DI;$$

$$ADI, BDI;$$

$$CDI, DDI$$

Corner ray intersection points $$\gamma_{Mch} = \tan^{-1} \frac{YI_{ch}}{XI_{ch}}$$

$$YI_{ch} = m_{Mch} \cdot XI_{ch} + b_{Mch}$$

$$AI_{ch} = \frac{-F_{Mch} \pm \sqrt{F_{Mn}^2 - 4E_{Mch}G_{Mch}}}{2E_{Mch}}$$

$$E_{Mch} = 1 + m_{Mch}^2$$

$$F_{Mch} = 2 \cdot m_{Mch} \cdot b_{Mch}$$

$$F_{Mch} = 2 \cdot m_{Mch} \cdot b_{Mch}$$

The source-septa corner array equations can be given by:

$$y_{Mch} = m_{Mch} \cdot x + b_{Mch}$$

$$m_{Mch} = \frac{Y_{ch} - y_s}{X_{ch} - x_s}$$

$$b_{Mch} = y_s - m_{Mch} \cdot x_s.$$

Figure 14A:
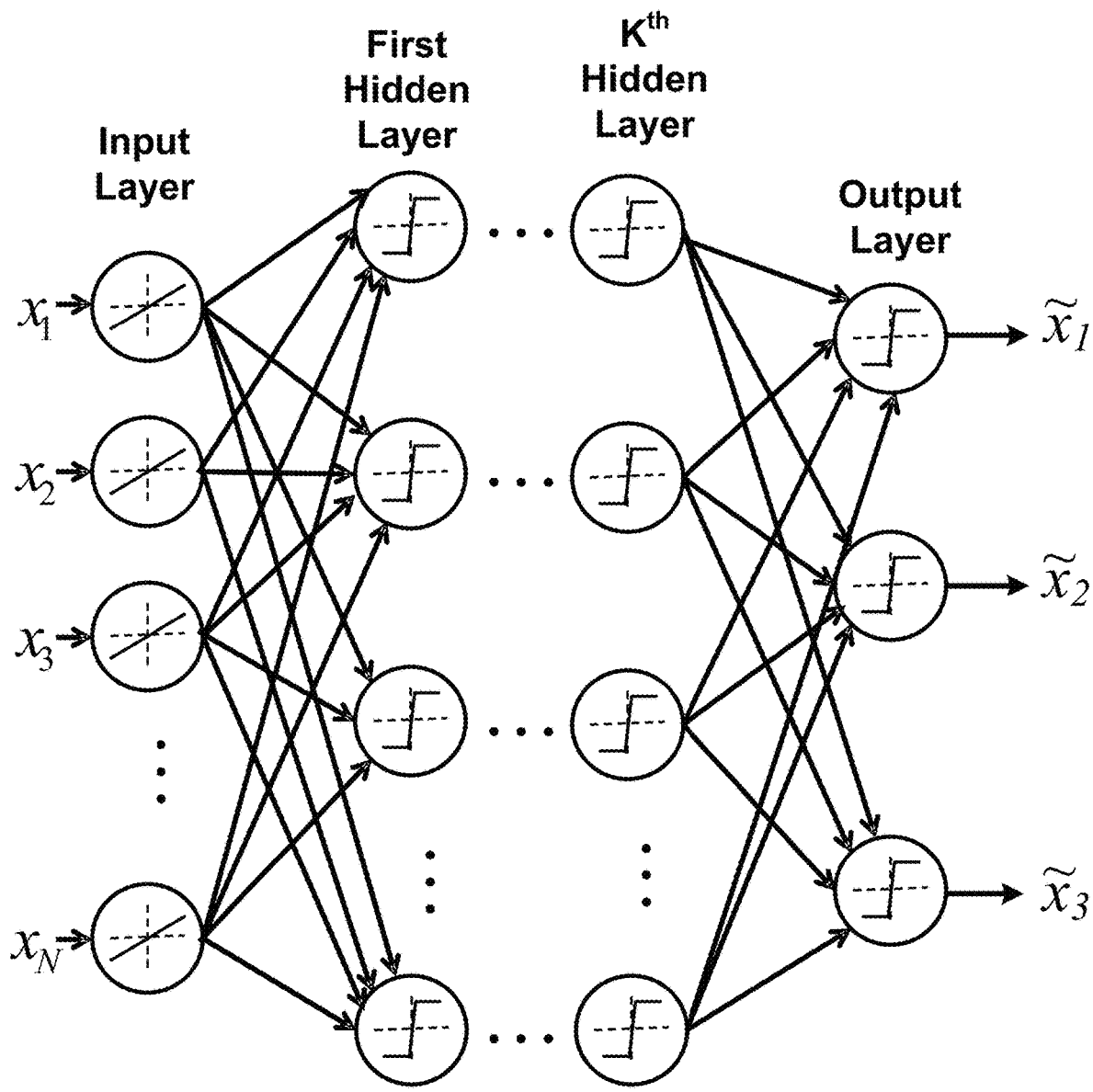
FIG. 14A shows an example of a general artificial neural network (ANN) having N inputs, K hidden layers, and three outputs, according to an embodiment of the present disclosure.
Figure 14B:
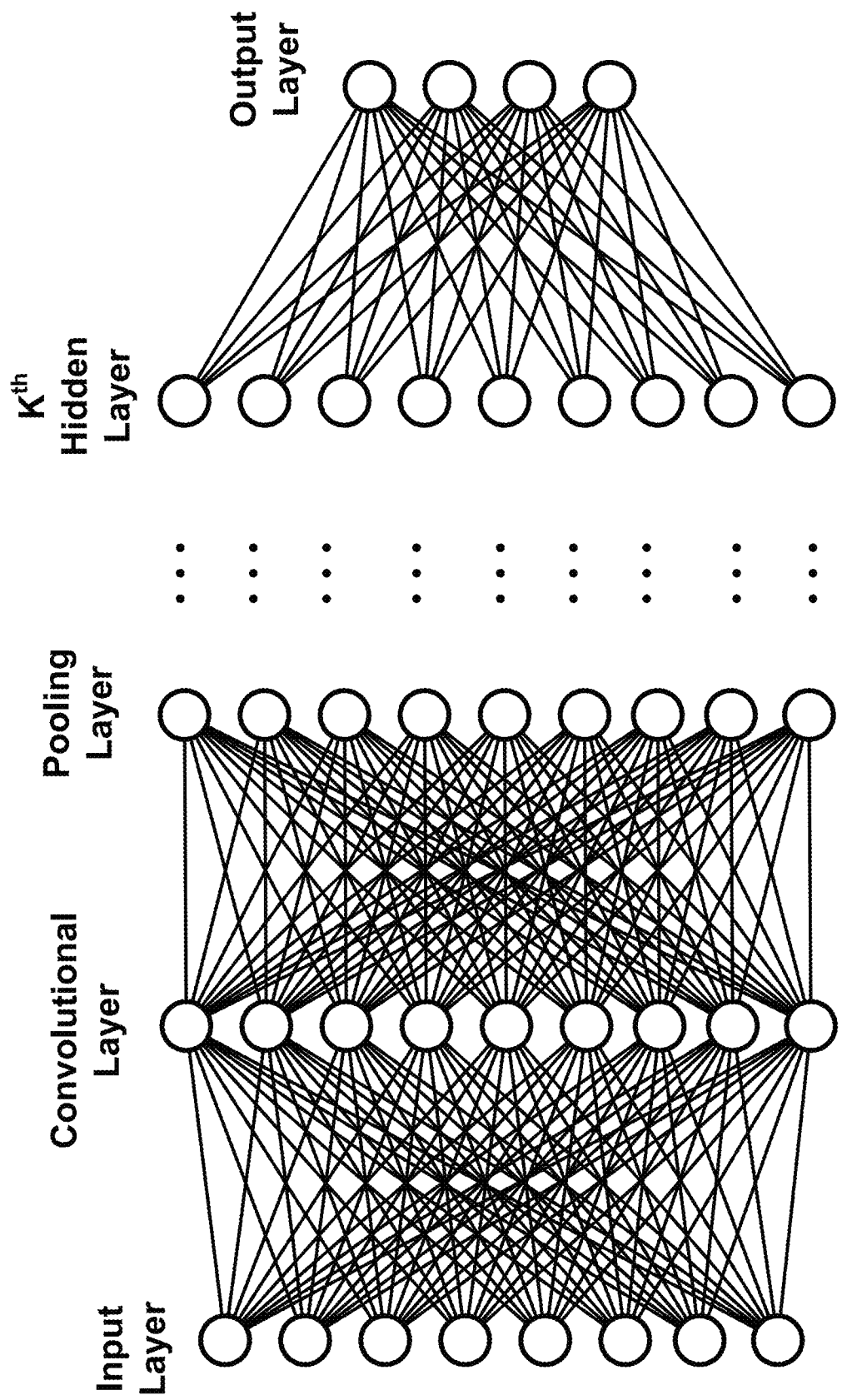
FIG. 14B shows a non-limiting example of a convolutional neural network (CNN), as in the present disclosure.

FIGS. 14A and 14B show various examples of a deep learning (DL) network.

FIG. 14A shows an example of a general artificial neural network (ANN) having N inputs, K hidden layers, and three outputs. Each layer is made up of nodes (also called neurons), and each node performs a weighted sum of the inputs and compares the result of the weighted sum to a threshold to generate an output. ANNs make up a class of functions for which the members of the class are obtained by varying thresholds, connection weights, or specifics of the architecture such as the number of nodes and/or their connectivity. The nodes in an ANN can be referred to as neurons (or as neuronal nodes), and the neurons can have inter-connections between the different layers of the ANN system. The simplest ANN has three layers, and is called an autoencoder. The DL network generally has more than three layers of neurons, and has as many outputs neurons $\tilde{x}_N$ as input neurons, wherein N is the number of pixels in the reconstructed image (sinogram). The synapses (i.e., the connections between neurons) store values called "weights" (also interchangeably referred to as "coefficients" or "weighting coefficients") that manipulate the data in the calculations. The outputs of the ANN depend on three types of parameters: (i) the interconnection pattern between the different layers of neurons, (ii) the learning process for updating the weights of the interconnections, and (iii) the activation function that converts a neuron's weighted input to its output activation.

Mathematically, a neuron's network function m(x) is defined as a composition of other functions $n_i(x)$, which can further be defined as a composition of other functions. This can be conveniently represented as a network structure, with arrows depicting the dependencies between variables, as shown in the figures. For example, the ANN can use a nonlinear weighted sum, wherein $m(x) = K(\Sigma_i w_i n_i(x))$, where K (commonly referred to as the activation function) is some predefined function, such as the hyperbolic tangent.

In FIG. 14A (and similarly in FIG. 14B), the neurons (i.e., nodes) are depicted by circles around a threshold function. For the non-limiting example shown in FIG. 19A, the inputs are depicted as circles around a linear function, and the arrows indicate directed connections between neurons. In certain implementations, the DL network is a feedforward network as exemplified in FIGS. 14A and 14B (e.g., it can be represented as a directed acyclic graph).

The DL network 135 operates to achieve a specific task, such as denoising a CT image, by searching within the class of functions F to learn, using a set of observations, to find m*∈F which solves the specific task in some optimal sense. For example, in certain implementations, this can be achieved by defining a cost function C: F→m such that, for the optimal solution m*, $C(m^*) \leq C(m) \forall m \in F$ (i.e., no solution has a cost less than the cost of the optimal solution). The cost function C is a measure of how far away a particular solution is from an optimal solution to the problem to be solved (e.g., the error). Learning algorithms iteratively search through the solution space to find a function that has the smallest possible cost. In certain implementations, the cost is minimized over a sample of the data (i.e., the training data).

FIG. 14B shows a non-limiting example in which the DL network is a convolutional neural network (CNN). CNNs are type of ANN that has beneficial properties for image processing, and, therefore, have specially relevancy for the applications of image denoising and sinogram restoration. CNNs use feed-forward ANNs in which the connectivity pattern between neurons can represent convolutions in image processing. For example, CNNs can be used for image-processing optimization by using multiple layers of small neuron collections which process portions of the input image, called receptive fields. The outputs of these collections can then tiled so that they overlap, to obtain a better representation of the original image. This processing pattern can be repeated over multiple layers having alternating convolution and pooling layers.

Figure 15:
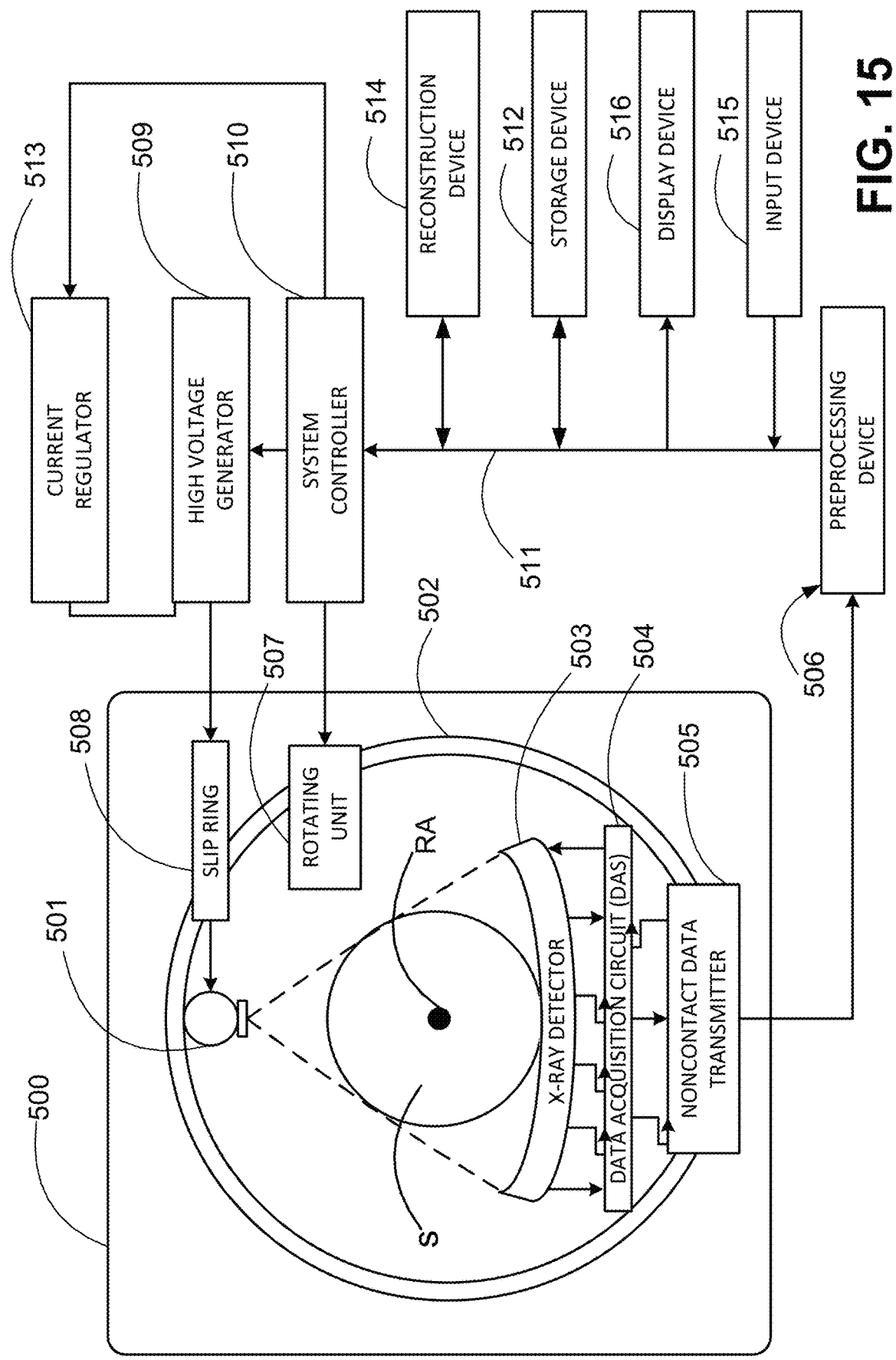
FIG. 15 illustrates an implementation of the radiography gantry included in a CT apparatus or scanner, according to an embodiment of the present disclosure.

FIG. 15 illustrates an implementation of the radiography gantry included in a CT apparatus or scanner, according to an embodiment of the present disclosure. As shown in FIG. 15, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA. A rotating unit 507 rotates the annular frame 502 at a high speed, such as 0.4 sec/rotation, while the object OBJ is being moved along the axis RA into or out of the illustrated page.

The first embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal. The X-ray detector 503 and the DAS 504 are configured to handle a predetermined total number of projections per rotation (TPPR).

The above-described data is sent to a preprocessing device 506, which is housed in a console outside the radiography gantry 500 through a non-contact data transmitter 505. The preprocessing device 506 performs certain corrections, such as sensitivity correction on the raw data. A memory 512 stores the resultant data, which is also called projection data at a stage immediately before reconstruction processing. The memory 512 is connected to a system controller 510 through a data/control bus 511, together with a reconstruction device 514, input device 515, and display 516. The system controller 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The memory 512 can store the measurement value representative of the irradiance of the X-rays at the X-ray detector unit 503. Further, the memory 512 can store a dedicated program for executing various steps of the methods described herein.

The reconstruction device 514 can execute various steps of the methods described herein. Further, reconstruction device 514 can execute pre-reconstruction processing image processing such as volume rendering processing and image difference processing as needed.

The pre-reconstruction processing of the projection data performed by the preprocessing device 506 can include correcting for detector calibrations, detector nonlinearities, and polar effects, for example. Further, the pre-reconstruction processing can include various steps of the methods described herein.

Post-reconstruction processing performed by the reconstruction device 514 can include filtering and smoothing the image, volume rendering processing, and image difference processing as needed. The image reconstruction process can implement various of the steps of the methods described herein in addition to various CT image reconstruction methods. The reconstruction device 514 can use the memory to store, e.g., projection data, reconstructed images, calibration data and parameters, and computer programs.

The reconstruction device 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 512 can be non-volatile, such as ROM, EPROM, EEPROM or FLASH memory. The memory 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The memory 512 can be a hard disk drive, CD-ROM drive, DVD drive, FLASH drive, RAM, ROM, or any other electronic storage known in the art.

Embodiments of the radiation detector apparatus data and the functional operations described in this specification can be implemented by digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of data processing apparatus, such as a networked device or server, user devices, and the like. The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

According to an embodiment, the processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

In another embodiment, the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

Figure 16:
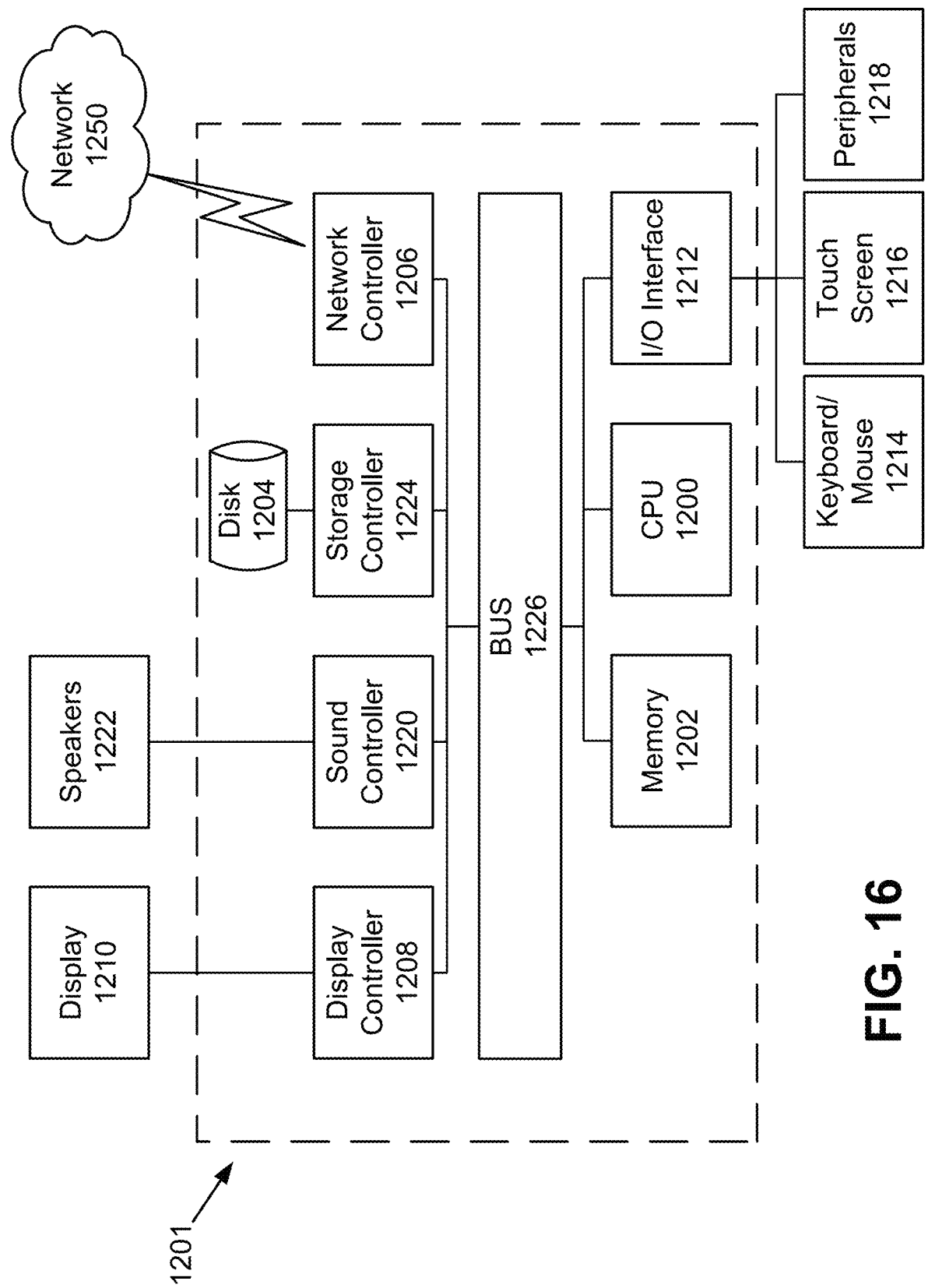
FIG. 16 illustrates a hardware description of a device 1201, according to an embodiment of the present disclosure.

FIG. 16 illustrates a hardware description of a device 1201, according to an embodiment of the present disclosure. In FIG. 16, the device 1201, which can be any of the above-described devices, including the server and the user device, includes processing circuitry. The processing circuitry includes one or more of the elements discussed next with reference to FIG. 16. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device 1201 communicates, such as a server or computer.

Further, the claimed advancements may be provided as a utility application, background daemon, or component of an operating system, or combination thereof, executing in conjunction with CPU 1200 and an operating system such as Microsoft Windows, UNIX, Solaris, LINUX, Apple MAC-OS and other systems known to those skilled in the art.

The hardware elements in order to achieve the device 1201 may be realized by various circuitry elements, known to those skilled in the art. For example, CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the processes described above.

The device 1201 in FIG. 16 also includes a network controller 1206, such as an Intel Ethernet PRO network interface card from Intel Corporation of America, for interfacing with network 1250. and to communicate with the other devices. As can be appreciated, the network 1250 can be a public network, such as the Internet, or a private network such as an LAN or WAN network, or any combination thereof and can also include PSTN or ISDN sub-networks. The network 1250 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device 1201 further includes a display controller 1208, such as a NVIDIA GeForce GTX or Quadro graphics adaptor from NVIDIA Corporation of America for interfacing with display 1210, such as an LCD monitor. A general purpose I/O interface 1212 interfaces with a keyboard and/or mouse 1214 as well as a touch screen panel 1216 on or separate from display 1210. General purpose I/O interface also connects to a variety of peripherals 1218 including printers and scanners.

The general-purpose storage controller 1224 connects the storage medium disk 1204 with communication bus 1226, which may be an ISA, EISA, VESA, PCI, or similar, for interconnecting all of the components of the device 1201. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

Figure 17:
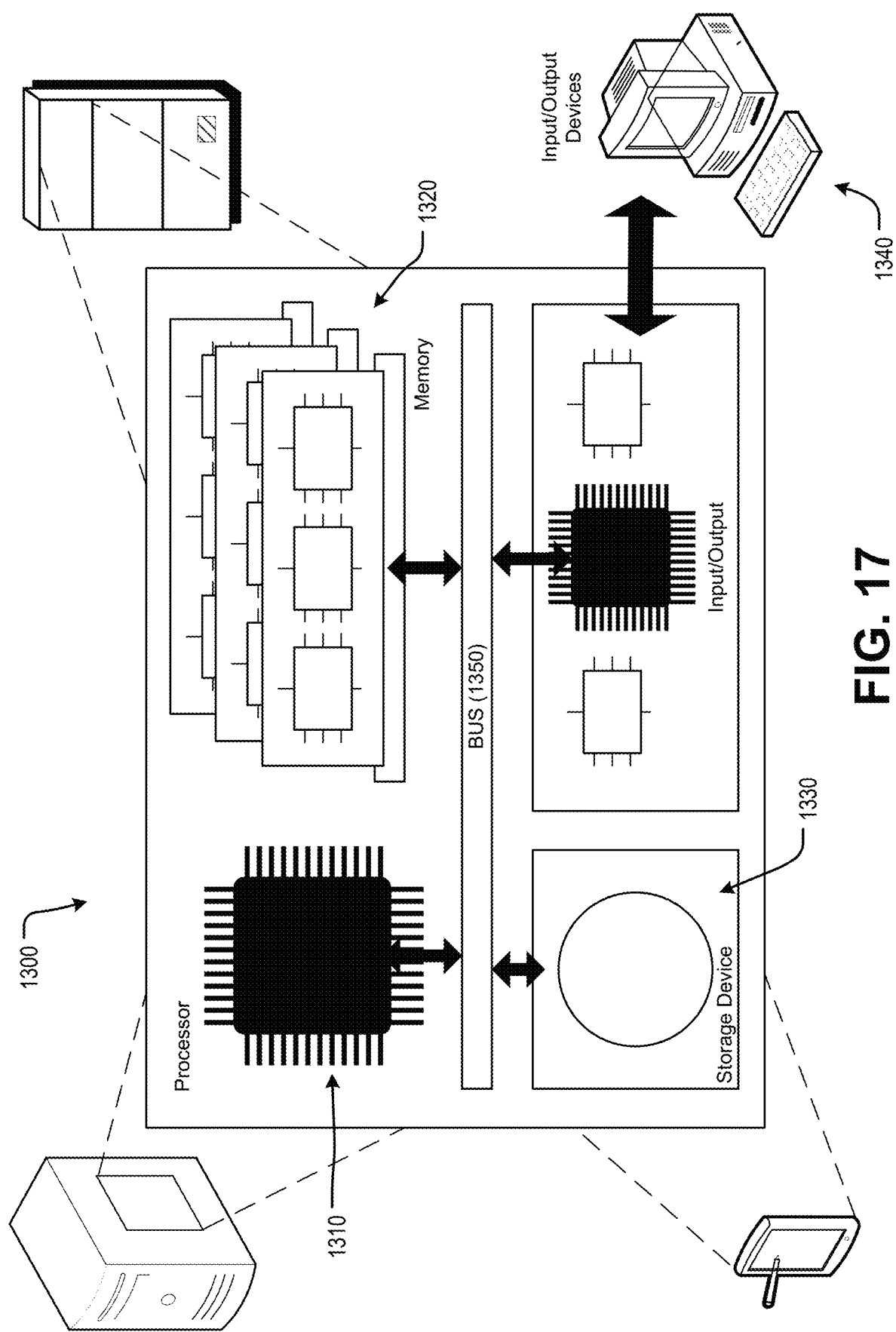
FIG. 17 illustrates an example of a type of computer, according to an embodiment of the present disclosure.

FIG. 17 illustrates an example of a type of computer, according to an embodiment of the present disclosure. The computer 1300 can be used for the operations described in association with any of the computer-implement methods described previously, according to one implementation. For example, the computer 1300 can be an example of a networked device such as the server including processing circuitry, as discussed herein. The processing circuitry includes one or more of the elements discussed next with reference to FIG. 13. In FIG. 13, the computer 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the computer 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the computer 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the computer 1300. In one implementation, the input/output device 1340 includes a keyboard and/or pointing device. In another implementation, the input/output device 1340 includes a display unit for displaying graphical user interfaces.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In the preceding description, specific details have been set forth, such as a particular geometry of a processing system and descriptions of various components and processes used therein. It should be understood, however, that techniques herein may be practiced in other embodiments that depart from these specific details, and that such details are for purposes of explanation and not limitation. Embodiments disclosed herein have been described with reference to the accompanying drawings. Similarly, for purposes of explanation, specific numbers, materials, and configurations have been set forth in order to provide a thorough understanding. Nevertheless, embodiments may be practiced without such specific details. Components having substantially the same functional constructions are denoted by like reference characters, and thus any redundant descriptions may be omitted.

Various techniques have been described as multiple discrete operations to assist in understanding the various embodiments. The order of description should not be construed as to imply that these operations are necessarily order dependent. Indeed, these operations need not be performed in the order of presentation. Operations described may be performed in a different order than the described embodiment. Various additional operations may be performed and/or described operations may be omitted in additional embodiments.

Embodiments of the present disclosure may also be as set forth in the following parentheticals.

(1) An imaging apparatus, comprising: a radiation detector including a plurality of channels; an anti-scatter grid (ASG) arranged on an incident side of the radiation detector and including a plurality of septa corresponding to the plurality of channels; and processing circuitry configured to obtain count data via an air scan using the ASG arranged on the radiation detector, determine, based on the obtained count data, ASG offset values for a first set of the plurality of septa, determine, based on the determined ASG offset values, a rotational offset distance of the ASG corresponding to a first channel, and adjust an arrangement of the ASG based on the determined rotational offset distance.

(2) The apparatus of (1), wherein the processing circuitry is further configured to determine, based on the determined ASG offset values, a lateral offset distance of the ASG corresponding to a second channel.

(3) The apparatus of either (2) or (3), wherein the processing circuitry is further configured to adjust the arrangement of the ASG based on the determined rotational offset distance and the determined lateral offset distance.

(4) The apparatus of any one of (1) to (3), wherein the processing circuitry is further configured to determine, based on the determined ASG offset values, a compression offset of the ASG.

(5) The apparatus of any one of (1) to (4), wherein the processing circuitry is further configured to adjust the arrangement of the ASG based on the determined rotational offset distance, the determined lateral offset distance, and the determined compression offset.

(6) The apparatus of any one of (1) to (5), wherein the processing circuitry is further configured to determine, based on a first ASG offset value of the determined ASG offset values corresponding to the first channel, the rotational offset distance of the ASG corresponding to the first channel using a pre-generated lookup table associating ASG offset values with corresponding rotational offset distances of the ASG.

(7) The apparatus of any one of (1) to (6), wherein the processing circuitry is further configured to generate the lookup table by simulating air count data for different values of the rotational offset distance, generating simulated ASG offset curves over the plurality of channels based on the simulated air count data, and correlating various rotational offset distances with corresponding ASG offset values corresponding to the first channel based on the simulated ASG offset curves.

(8) The apparatus of any one of (1) to (7), wherein the processing circuitry is further configured to determine the rotational offset distance corresponding to the first channel by applying the determined ASG offset values to a trained machine learning model.

(9) The apparatus of any one of (1) to (8), wherein the machine learning model includes a neural network trained using reference rotational offset distances and corresponding reference ASG offset values.

(10) The apparatus of any one of (1) to (9), wherein the processing circuitry is further configured to apply a smoothing process to the determined ASG offset values to generate a smoothed ASG offset curve before determining the rotational offset distance.

(11) A method of adjusting a component in an imaging apparatus, comprising: obtaining count data via an air scan using an anti-scatter grid (ASG) arranged on an incident side of a radiation detector including a plurality of channels and a plurality of septa corresponding to the plurality of channels, the ASG arranged on the radiation detector; determining, based on the obtained count data, ASG offset values for a first set of the plurality of septa; determining, based on the determined ASG offset values, a rotational offset distance of the ASG corresponding to a first channel; and adjusting an arrangement of the ASG based on the determined rotational offset distance.

(12) The method of (11), further comprising determining, based on the determined ASG offset values, a lateral offset distance of the ASG corresponding to a second channel.

(13) The method of either (11) or (12), wherein the adjusting the arrangement of the ASG is based on the determined rotational offset distance and the determined lateral offset distance.

(14) The method of any one of (11) to (13), further comprising determining, based on the determined ASG offset values, a compression offset of the ASG.

(15) The method of any one of (11) to (14), wherein the adjusting the arrangement of the ASG is based on the determined rotational offset distance, the determined lateral offset distance, and the determined compression offset.

(16) The method of any one of (11) to (15), further comprising determining, based on a first ASG offset value of the determined ASG offset values corresponding to the first channel, the rotational offset distance of the ASG corresponding to the first channel using a pre-generated lookup table associating ASG offset values with corresponding rotational offset distances of the ASG.

(17) The method of any one of (11) to (16), wherein the pre-generated lookup table is generated by simulating air count data for different values of the rotational offset distance, generating simulated ASG offset curves over the plurality of channels based on the simulated air count data, and correlating various rotational offset distances with corresponding ASG offset values corresponding to the first channel based on the simulated ASG offset curves.

(18) The method of any one of (11) to (17), wherein the rotational offset distance corresponding to the first channel is determined by applying the determined ASG offset values to a trained machine learning model.

(19) The method of any one of (11) to (18), wherein the machine learning model includes a neural network trained using reference rotational offset distances and corresponding reference ASG offset values.

(20) A non-transitory computer-readable storage medium including executable instructions, which when executed by circuitry, cause the circuitry to perform a method of adjusting an ASG in an imaging apparatus, comprising obtaining count data via an air scan using an anti-scatter grid (ASG) arranged on an incident side of a radiation detector including a plurality of channels and a plurality of septa corresponding to the plurality of channels, the ASG arranged on the radiation detector; determining, based on the obtained count data, ASG offset values for a first set of the plurality of septa; determining, based on the determined ASG offset values, a rotational offset distance of the ASG corresponding to a first channel; and adjusting an arrangement of the ASG based on the determined rotational offset distance.

Those skilled in the art will also understand that there can be many variations made to the operations of the techniques explained above while still achieving the same objectives of the invention. Such variations are intended to be covered by the scope of this disclosure. As such, the foregoing descriptions of embodiments of the invention are not intended to be limiting. Rather, any limitations to embodiments of the invention are presented in the following claims.

What is claimed is:

1. An imaging apparatus, comprising:
a radiation detector including a plurality of channels;
an anti-scatter grid (ASG) arranged on an incident side of the radiation detector and including a plurality of septa corresponding to the plurality of channels; and
processing circuitry configured to
obtain count data via an air scan using the ASG arranged on the radiation detector,
determine, based on the obtained count data, ASG offset values for a first set of the plurality of septa,
determine, based on the determined ASG offset values, a rotational offset distance of the ASG corresponding to a first channel, and
adjust an arrangement of the ASG based on the determined rotational offset distance.

2. The apparatus of claim 1, wherein the processing circuitry is further configured to
determine, based on the determined ASG offset values, a lateral offset distance of the ASG corresponding to a second channel.

3. The apparatus of claim 2, wherein the processing circuitry is further configured to adjust the arrangement of the ASG based on the determined rotational offset distance and the determined lateral offset distance.

4. The apparatus of claim 2, wherein the processing circuitry is further configured to
determine, based on the determined ASG offset values, a compression offset of the ASG.

5. The apparatus of claim 4, wherein the processing circuitry is further configured to adjust the arrangement of the ASG based on the determined rotational offset distance, the determined lateral offset distance, and the determined compression offset.

6. The apparatus of claim 1, wherein the processing circuitry is further configured to determine, based on a first ASG offset value of the determined ASG offset values corresponding to the first channel, the rotational offset distance of the ASG corresponding to the first channel using a pre-generated lookup table associating ASG offset values with corresponding rotational offset distances of the ASG.

7. The apparatus of claim 6, wherein the processing circuitry is further configured to generate the lookup table by
simulating air count data for different values of the rotational offset distance,
generating simulated ASG offset curves over the plurality of channels based on the simulated air count data, and
correlating various rotational offset distances with corresponding ASG offset values corresponding to the first channel based on the simulated ASG offset curves.

8. The apparatus of claim 6, wherein the processing circuitry is further configured to determine the rotational offset distance corresponding to the first channel by applying the determined ASG offset values to a trained machine learning model.

9. The apparatus of claim 8, wherein the machine learning model includes a neural network trained using reference rotational offset distances and corresponding reference ASG offset values.

10. The apparatus of claim 4, wherein the processing circuitry is further configured to apply a smoothing process to the determined ASG offset values to generate a smoothed ASG offset curve before determining the rotational offset distance.

11. A method of adjusting an anti-scatter grid (ASG) in an imaging apparatus, comprising:
obtaining count data via an air scan using an anti-scatter grid (ASG) arranged on an incident side of a radiation detector including a plurality of channels and a plurality of septa corresponding to the plurality of channels, the ASG arranged on the radiation detector;
determining, based on the obtained count data, ASG offset values for a first set of the plurality of septa;
determining, based on the determined ASG offset values, a rotational offset distance of the ASG corresponding to a first channel; and
adjusting an arrangement of the ASG based on the determined rotational offset distance.

12. The method of claim 11, further comprising determining, based on the determined ASG offset values, a lateral offset distance of the ASG corresponding to a second channel.

13. The method of claim 12, wherein the adjusting the arrangement of the ASG is based on the determined rotational offset distance and the determined lateral offset distance.

14. The method of claim 12, further comprising determining, based on the determined ASG offset values, a compression offset of the ASG.

15. The method of claim 14, wherein the adjusting the arrangement of the ASG is based on the determined rotational offset distance, the determined lateral offset distance, and the determined compression offset.

16. The method of claim 11, further comprising determining, based on a first ASG offset value of the determined ASG offset values corresponding to the first channel, the rotational offset distance of the ASG corresponding to the first channel using a pre-generated lookup table associating ASG offset values with corresponding rotational offset distances of the ASG.

17. The method of claim 16, wherein the pre-generated lookup table is generated by
simulating air count data for different values of the rotational offset distance,
generating simulated ASG offset curves over the plurality of channels based on the simulated air count data, and
correlating various rotational offset distances with corresponding ASG offset values corresponding to the first channel based on the simulated ASG offset curves.

18. The method of claim 16, wherein the rotational offset distance corresponding to the first channel is determined by applying the determined ASG offset values to a trained machine learning model.

19. The method of claim 18, wherein the machine learning model includes a neural network trained using reference rotational offset distances and corresponding reference ASG offset values.

20. A non-transitory computer-readable storage medium including executable instructions, which when executed by circuitry, cause the circuitry to perform a method of adjusting an ASG in an imaging apparatus, comprising:
- obtaining count data via an air scan using an anti-scatter grid (ASG) arranged on an incident side of a radiation detector including a plurality of channels and a plurality of septa corresponding to the plurality of channels, the ASG arranged on the radiation detector;
- determining, based on the obtained count data, ASG offset values for a first set of the plurality of septa;
- determining, based on the determined ASG offset values, a rotational offset distance of the ASG corresponding to a first channel; and
- adjusting an arrangement of the ASG based on the determined rotational offset distance.

* * * * *